(12) United States Patent
Sathaye et al.

(10) Patent No.: US 12,493,821 B2
(45) Date of Patent: Dec. 9, 2025

(54) MACHINE LEARNING TECHNIQUES FOR DYNAMIC ADJUSTMENT OF AN IMMERSIVE AUGMENTED REALITY SUPERVISION BOUNDARY

(71) Applicant: Optum, Inc., Minnetonka, MN (US)

(72) Inventors: Ninad D. Sathaye, Bangalore (IN); Piyush Gupta, Bangalore (IN); Harmeet S. Gambhir, Gurgaon (IN)

(73) Assignee: Optum, Inc., Minnetonka, MN (US)

( * ) Notice: Subject to any disclaimer, the term of this patent is extended or adjusted under 35 U.S.C. 154(b) by 798 days.

(21) Appl. No.: 17/663,725

(22) Filed: May 17, 2022

(65) Prior Publication Data

US 2023/0376823 A1    Nov. 23, 2023

(51) Int. Cl.
*G06N 20/00* (2019.01)
(52) U.S. Cl.
CPC .................... *G06N 20/00* (2019.01)
(58) Field of Classification Search
CPC .......................................... G06N 20/00
See application file for complete search history.

(56) References Cited

U.S. PATENT DOCUMENTS

| | | | |
|---|---|---|---|
| 9,788,160 B1 | 10/2017 | Gu et al. | |
| 9,860,697 B2 | 1/2018 | Frenz | |
| 10,075,812 B1 | 9/2018 | DeLuca et al. | |
| 10,231,079 B2 | 3/2019 | Barron et al. | |
| 10,726,699 B2 | 7/2020 | Devdas et al. | |
| 10,924,880 B1 | 2/2021 | Sokolov et al. | |
| 10,972,864 B2 * | 4/2021 | Bai | H04W 4/024 |

(Continued)

FOREIGN PATENT DOCUMENTS

| | | |
|---|---|---|
| WO | 2020/181337 A1 | 9/2020 |
| WO | 2021/174229 A2 | 9/2021 |

OTHER PUBLICATIONS

"Alzheimer's Disease & Dementia Help," Alzheimer's Associate, (9 pages), (online), [Retrieved from the Internet Jul. 19, 2022] <URL: https://www.alz.org/>.

(Continued)

*Primary Examiner* — Barbara M Level
(74) *Attorney, Agent, or Firm* — Alston & Bird LLP

(57) ABSTRACT

Various embodiments of the present invention provide methods, apparatuses, systems, computing devices, computing entities, and/or the like for performing AR processing using at least one of: (i) an exposure classification machine learning framework comprises a real-time embedding machine learning model, an exposure clustering machine learning model, and a cluster mapping machine learning model, (ii) supervision boundary reliability scores determined based at least in part on covered subsets for immersive AR supervision boundaries, (iii) supervision boundary reachability scores determined based at least in part on response node locations and least reachable locations of immersive AR supervision boundaries, or (iv) performing one or more AR interaction actions based at least in part on an updated immersive AR supervision boundary that is generated by reducing a supervision boundary area of the current immersive AR supervision boundary so that the supervision boundary reliability score satisfies the supervision boundary reliability score threshold.

20 Claims, 17 Drawing Sheets

(56) References Cited

U.S. PATENT DOCUMENTS

| | | | | |
|---|---|---|---|---|
| 11,321,568 | B1* | 5/2022 | Bozinovic | H04N 19/62 |
| 11,599,830 | B1* | 3/2023 | Nudd | G06N 20/00 |
| 12,191,035 | B1* | 1/2025 | Pala | G16H 50/20 |
| 2015/0269824 | A1* | 9/2015 | Zhang | A61B 5/746 |
| | | | | 340/539.12 |
| 2015/0269827 | A1* | 9/2015 | Hopkins | G08B 21/0446 |
| | | | | 340/539.12 |
| 2017/0188216 | A1* | 6/2017 | Koskas | H04W 4/90 |
| 2017/0231528 | A1* | 8/2017 | Nathan | A61B 5/4082 |
| | | | | 600/483 |
| 2018/0027370 | A1* | 1/2018 | Austraat | H04L 67/10 |
| | | | | 455/456.1 |
| 2019/0333106 | A1 | 10/2019 | Polachi | |
| 2020/0137357 | A1* | 4/2020 | Kapoustin | G08B 21/02 |
| 2023/0140093 | A1* | 5/2023 | Cheng | G06N 3/09 |
| | | | | 340/573.1 |
| 2024/0115217 | A1* | 4/2024 | Raven | A61B 5/7267 |

OTHER PUBLICATIONS

Alsaqer, Mohammed et al. "Indirect Wayfinding Navigation System for the Elderly," Twenty-First Americas Conference on Information Systems, (Year: 2015), pp. 1-13, available online at https://citeseerx.ist.psu.edu/viewdoc/download?doi=10.1.1.966.3941&rep=rep1&type=pdf.

Mayo Clinic Staff. "Alzheimer's: Understand Wandering and How to Address It," Mayo Clinic, Aug. 7, 2020, (3 pages), (article, online), [Retrieved from the Internet Jul. 19, 2022] <URL: https://www.mayoclinic.org/healthy-lifestyle/caregivers/in-depth/alzheimers/art-20046222>.

\* cited by examiner

HEART FAILURE

| Care Giver | Circumstantial Capability | Percentile of (ETA) | Previous Ranking based on patient experience | Care Giver Responsiveness Index | Final Ranking (Weighted Averages) |
|---|---|---|---|---|---|
| MIDWEST HEART CENTER | Y | 0.996 | 0.77 | 0.5 | 0.5815 |
| SAINT JOHNS HEART INSTITUTE | Y | 0.993 | 0.31 | 0.657 | 0.5255 |
| GOOD HEART MEDICAL CENTER | Y | 0.869 | 0.36 | 0.612 | 0.51025 |

MACHINE LEARNING TECHNIQUES FOR DYNAMIC ADJUSTMENT OF AN IMMERSIVE AUGMENTED REALITY SUPERVISION BOUNDARY

BACKGROUND

Various embodiments of the present invention address technical challenges related to performing augmented reality (AR) processing.

BRIEF SUMMARY

In general, embodiments of the present invention provide methods, apparatuses, systems, computing devices, computing entities, and/or the like for performing AR processing. For example, various embodiments of the present invention provide methods, apparatuses, systems, computing devices, computing entities, and/or the like for performing AR processing using at least one of: (i) an exposure classification machine learning framework comprises a real-time embedding machine learning model, an exposure clustering machine learning model, and a cluster mapping machine learning model, (ii) supervision boundary reliability scores determined based at least in part on covered subsets for immersive AR supervision boundaries, (iii) supervision boundary reachability scores determined based at least in part on response node locations and least reachable locations of immersive AR supervision boundaries, or (iv) performing one or more AR interaction actions based at least in part on an updated immersive AR supervision boundary that is generated by reducing a supervision boundary area of the current immersive AR supervision boundary so that the supervision boundary reliability score satisfies the supervision boundary reliability score threshold.

In accordance with one aspect, a method includes: generating, using an exposure classification machine learning framework and based at least in part on a real-time monitoring data object associated with the AR device and a historical state data object associated with the AR device, an exposure classification for the AR device, wherein: (i) the exposure classification machine learning framework comprises a real-time embedding machine learning model, an exposure clustering machine learning model, and a cluster mapping machine learning model, (ii) the real-time embedding machine learning model is configured to generate a real-time monitoring embedding for the AR device based at least in part on the real-time monitoring data object and the historical state data object, (iii) the exposure clustering machine learning model is configured to generate a selected exposure cluster for the AR device based at least in part on the real-time monitoring embedding for the AR device, and (iv) the cluster mapping machine learning model is configured to map the selected exposure cluster for the AR device to the exposure classification for the AR device based at least in part on a cluster affinity score for the real-time monitoring embedding with respect to the selected exposure cluster; and in response to determining that the AR device is associated with an affirmative exposure cluster: (i) identifying one or more proximate response nodes that are associated with a monitoring category for the AR device and a current AR device location for the AR device, (ii) for each proximate response node, generating, using a responsiveness scoring machine learning model and based at least in part on one or more responsiveness parameters associated with the proximate response node, a responsiveness score, wherein one or more responsiveness parameters comprise a real-time reachability score that is determined based at least in part on a node location for the proximate response node and the current AR device location, (iii) determining a covered subset of the one or more proximate response nodes, wherein: (a) each proximate response node in the covered subset is associated with a supervision boundary reachability score that satisfies a supervision boundary reachability score threshold, and (b) each supervision boundary reachability score for a corresponding proximate response node is determined based at least in part on the node location for the proximate response node and a least reachable location of a current immersive AR supervision boundary relative to the node location, (iv) determining, based at least in part on the covered subset, a supervision boundary reliability score, and (v) in response to determining that supervision boundary reliability score fails to satisfy a supervision boundary reliability score threshold, performing one or more AR interaction actions based at least in part on an updated immersive AR supervision boundary, wherein the updated immersive AR supervision boundary is generated by reducing a supervision boundary area of the current immersive AR supervision boundary so that the supervision boundary reliability score satisfies the supervision boundary reliability score threshold.

In accordance with another aspect, an apparatus comprising at least one processor and at least one memory including program code, the at least one memory and the program code configured to, with the processor, cause the apparatus to at least: generate, using an exposure classification machine learning framework and based at least in part on a real-time monitoring data object associated with the AR device and a historical state data object associated with the AR device, an exposure classification for the AR device, wherein: (i) the exposure classification machine learning framework comprises a real-time embedding machine learning model, an exposure clustering machine learning model, and a cluster mapping machine learning model, (ii) the real-time embedding machine learning model is configured to generate a real-time monitoring embedding for the AR device based at least in part on the real-time monitoring data object and the historical state data object, (iii) the exposure clustering machine learning model is configured to generate a selected exposure cluster for the AR device based at least in part on the real-time monitoring embedding for the AR device, and (iv) the cluster mapping machine learning model is configured to map the selected exposure cluster for the AR device to the exposure classification for the AR device based at least in part on a cluster affinity score for the real-time monitoring embedding with respect to the selected exposure cluster; and in response to determining that the AR device is associated with an affirmative exposure cluster: (i) identify one or more proximate response nodes that are associated with a monitoring category for the AR device and a current AR device location for the AR device, (ii) for each proximate response node, generate, using a responsiveness scoring machine learning model and based at least in part on one or more responsiveness parameters associated with the proximate response node, a responsiveness score, wherein one or more responsiveness parameters comprise a real-time reachability score that is determined based at least in part on a node location for the proximate response node and the current AR device location, (iii) determine a covered subset of the one or more proximate response nodes, wherein: (a) each proximate response node in the covered subset is associated with a supervision boundary reachability score that satisfies a supervision boundary reachability score threshold, and (b) each supervision boundary reachability score for a corresponding proximate response node is determined based at least in part on the node location for the proximate response node and a least reachable location of a current immersive AR supervision boundary relative to the node location, (iv) determine, based at least in part on the covered subset, a supervision boundary reliability score, and (v) in response to determining that supervision boundary reliability score fails to satisfy a supervision boundary reliability score threshold, perform one or more AR interaction actions based at least in part on an updated immersive AR supervision boundary, wherein the updated immersive AR supervision boundary is generated by reducing a supervision boundary area of the current immersive AR supervision boundary so that the supervision boundary reliability score satisfies the supervision boundary reliability score threshold.

In accordance with yet another aspect, a computer program product computer program comprising at least one non-transitory computer-readable storage medium having computer-readable program code portions stored therein, the computer-readable program code portions configured to: generate, using an exposure classification machine learning framework and based at least in part on a real-time monitoring data object associated with the AR device and a historical state data object associated with the AR device, an exposure classification for the AR device, wherein: (i) the exposure classification machine learning framework comprises a real-time embedding machine learning model, an exposure clustering machine learning model, and a cluster mapping machine learning model, (ii) the real-time embedding machine learning model is configured to generate a real-time monitoring embedding for the AR device based at least in part on the real-time monitoring data object and the historical state data object, (iii) the exposure clustering machine learning model is configured to generate a selected exposure cluster for the AR device based at least in part on the real-time monitoring embedding for the AR device, and (iv) the cluster mapping machine learning model is configured to map the selected exposure cluster for the AR device to the exposure classification for the AR device based at least in part on a cluster affinity score for the real-time monitoring embedding with respect to the selected exposure cluster; and in response to determining that the AR device is associated with an affirmative exposure cluster: (i) identify one or more proximate response nodes that are associated with a monitoring category for the AR device and a current AR device location for the AR device, (ii) for each proximate response node, generate, using a responsiveness scoring machine learning model and based at least in part on one or more responsiveness parameters associated with the proximate response node, a responsiveness score, wherein one or more responsiveness parameters comprise a real-time reachability score that is determined based at least in part on a node location for the proximate response node and the current AR device location, (iii) determine a covered subset of the one or more proximate response nodes, wherein: (a) each proximate response node in the covered subset is associated with a supervision boundary reachability score that satisfies a supervision boundary reachability score threshold, and (b) each supervision boundary reachability score for a corresponding proximate response node is determined based at least in part on the node location for the proximate response node and a least reachable location of a current immersive AR supervision boundary relative to the node location, (iv) determine, based at least in part on the covered subset, a supervision boundary reliability score, and (v) in response to determining that supervision boundary reliability score fails to satisfy a supervision boundary reliability score threshold, perform one or more AR interaction actions based at least in part on an updated immersive AR supervision boundary, wherein the updated immersive AR supervision boundary is generated by reducing a supervision boundary area of the current immersive AR supervision boundary so that the supervision boundary reliability score satisfies the supervision boundary reliability score threshold.

BRIEF DESCRIPTION OF THE DRAWINGS

Figure 1:
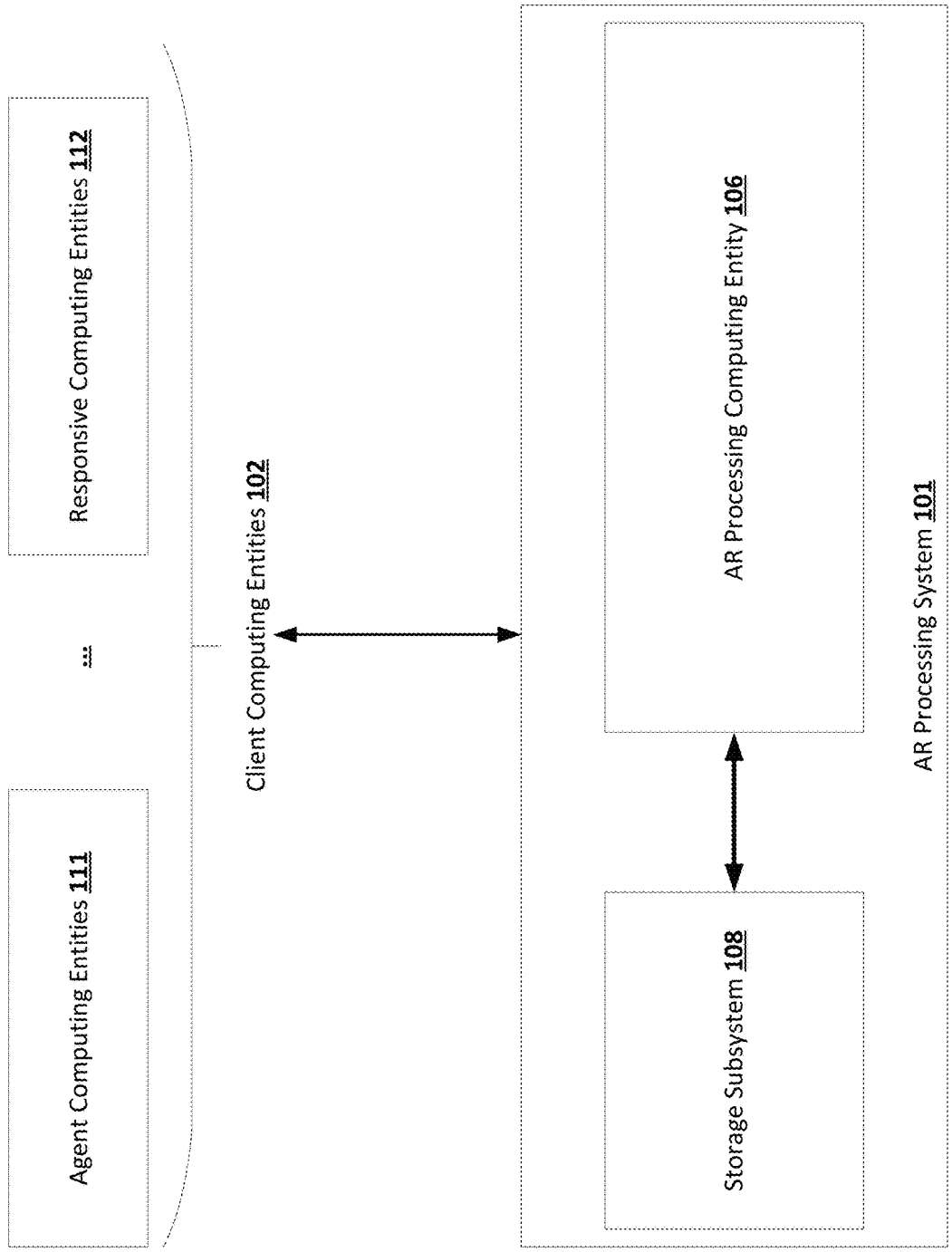
Figure 2:
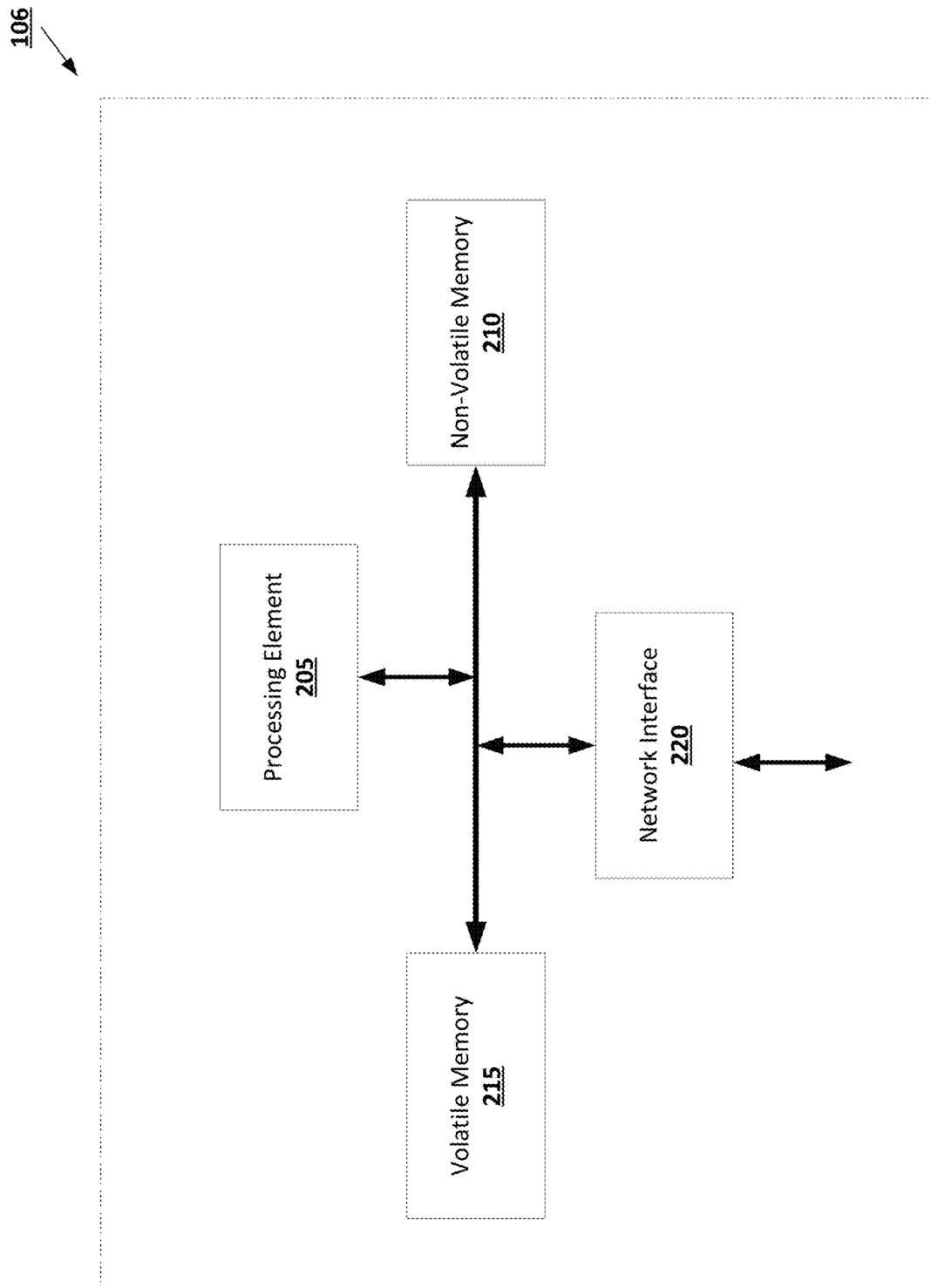
Figure 3:
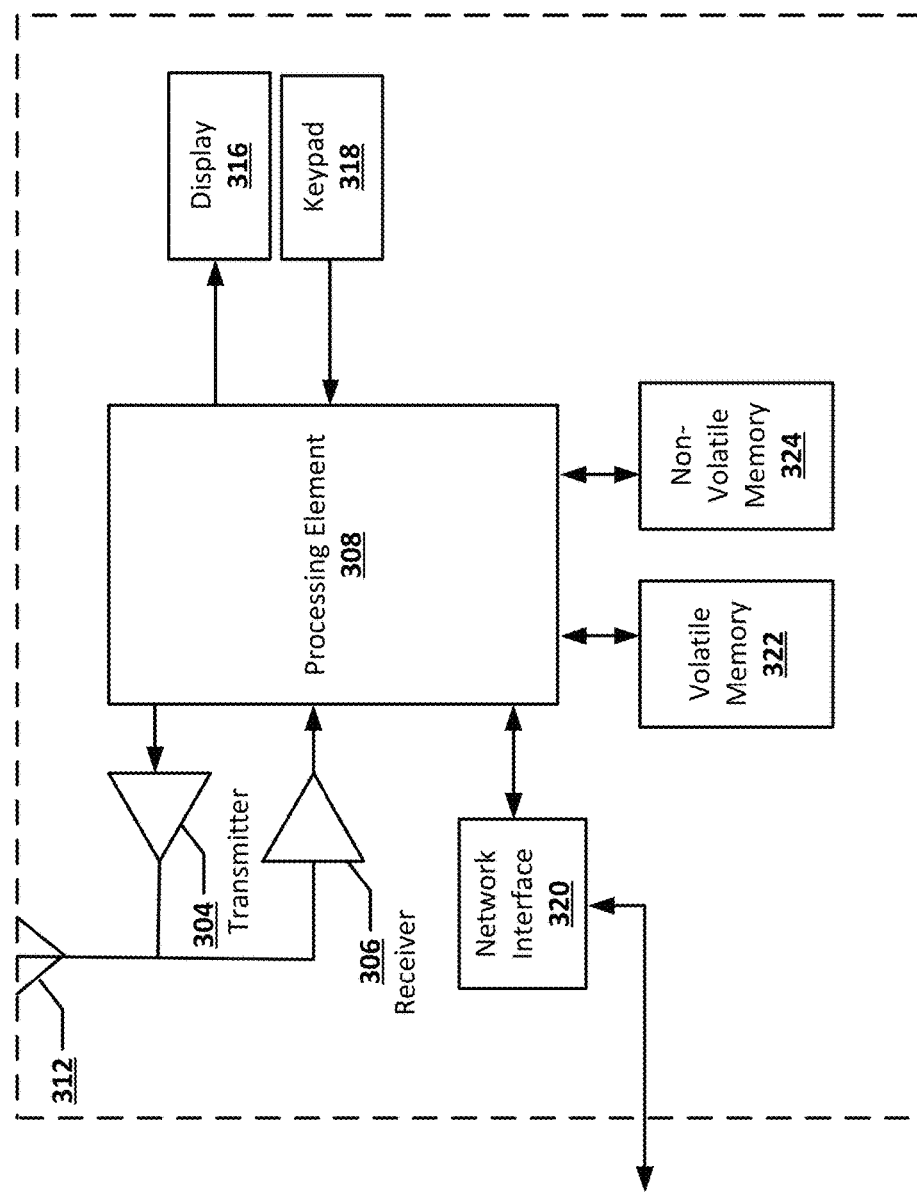
Figure 4:
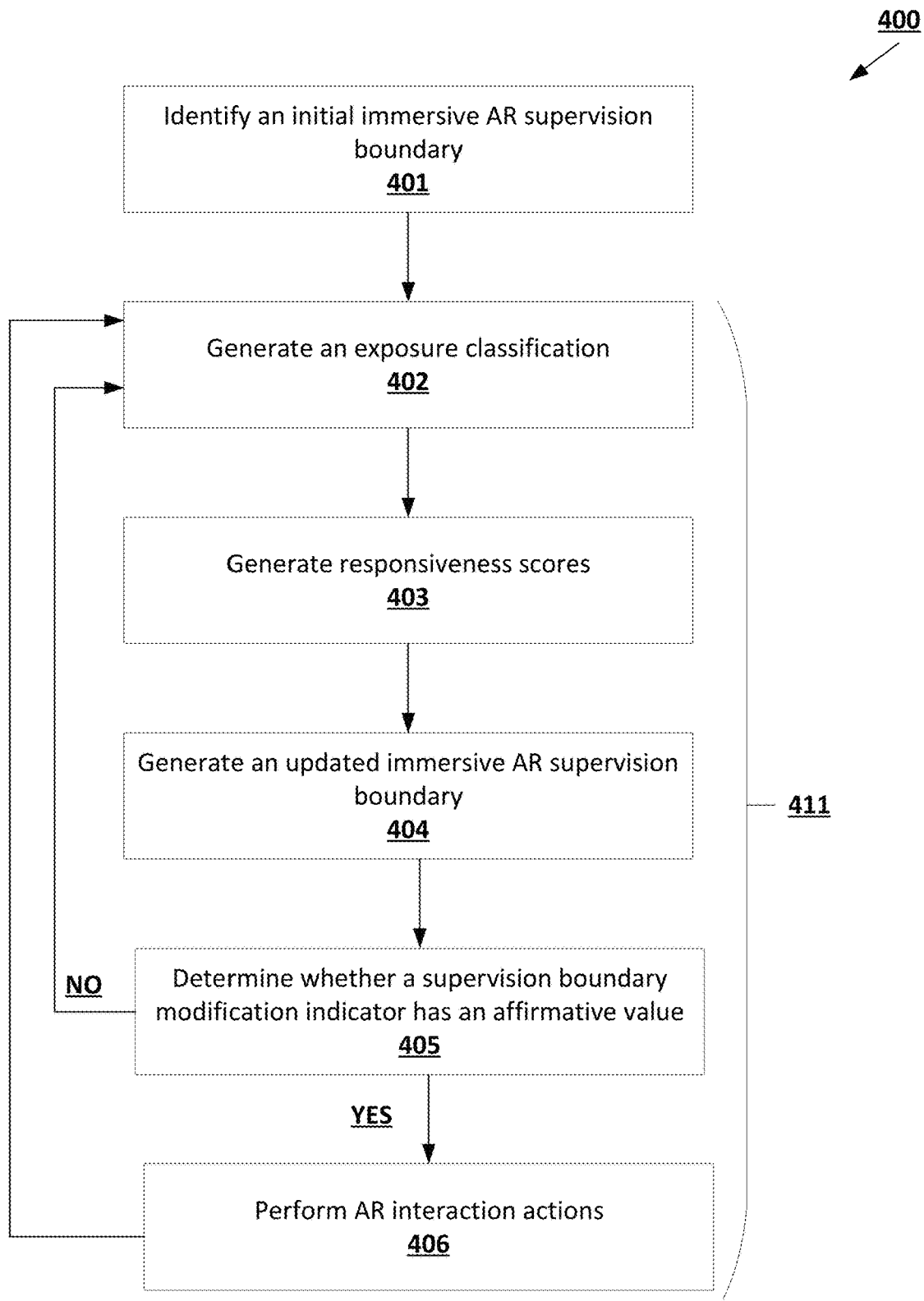
Figure 5:
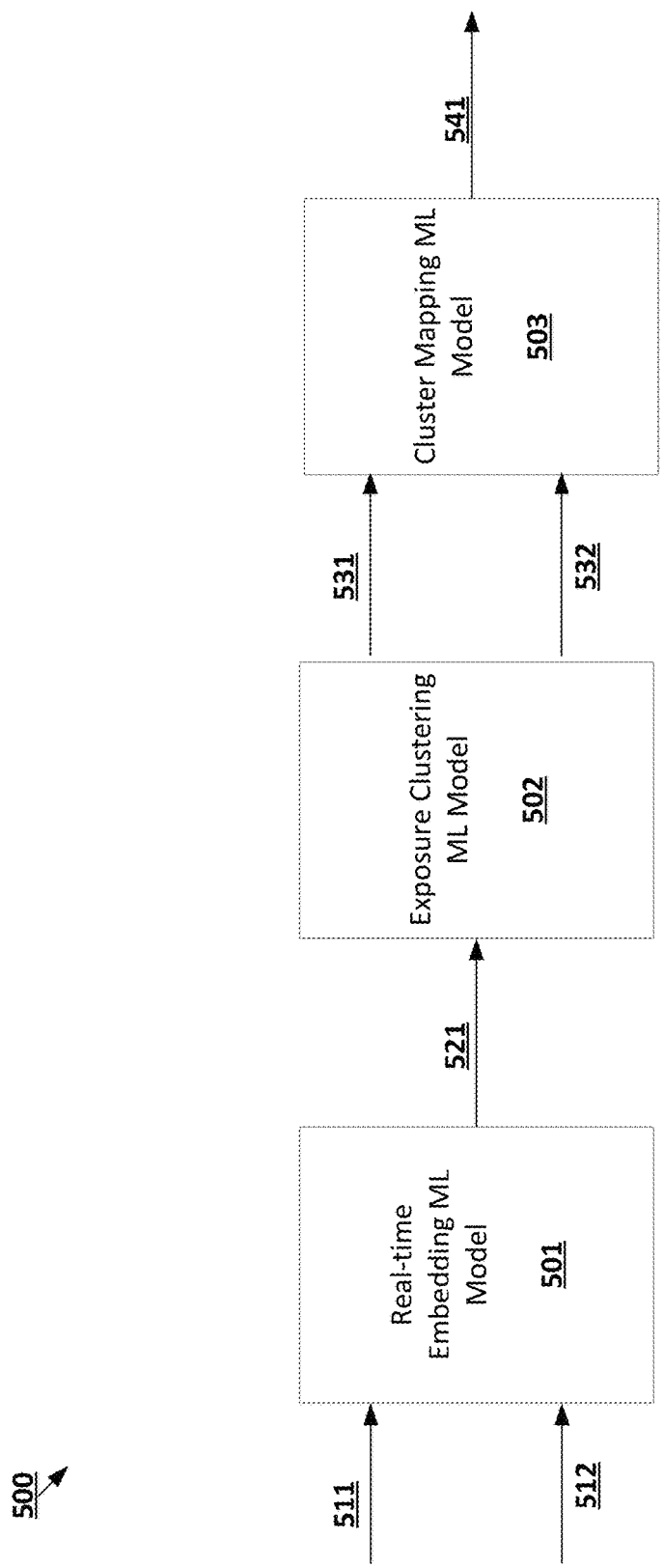
Figure 6:
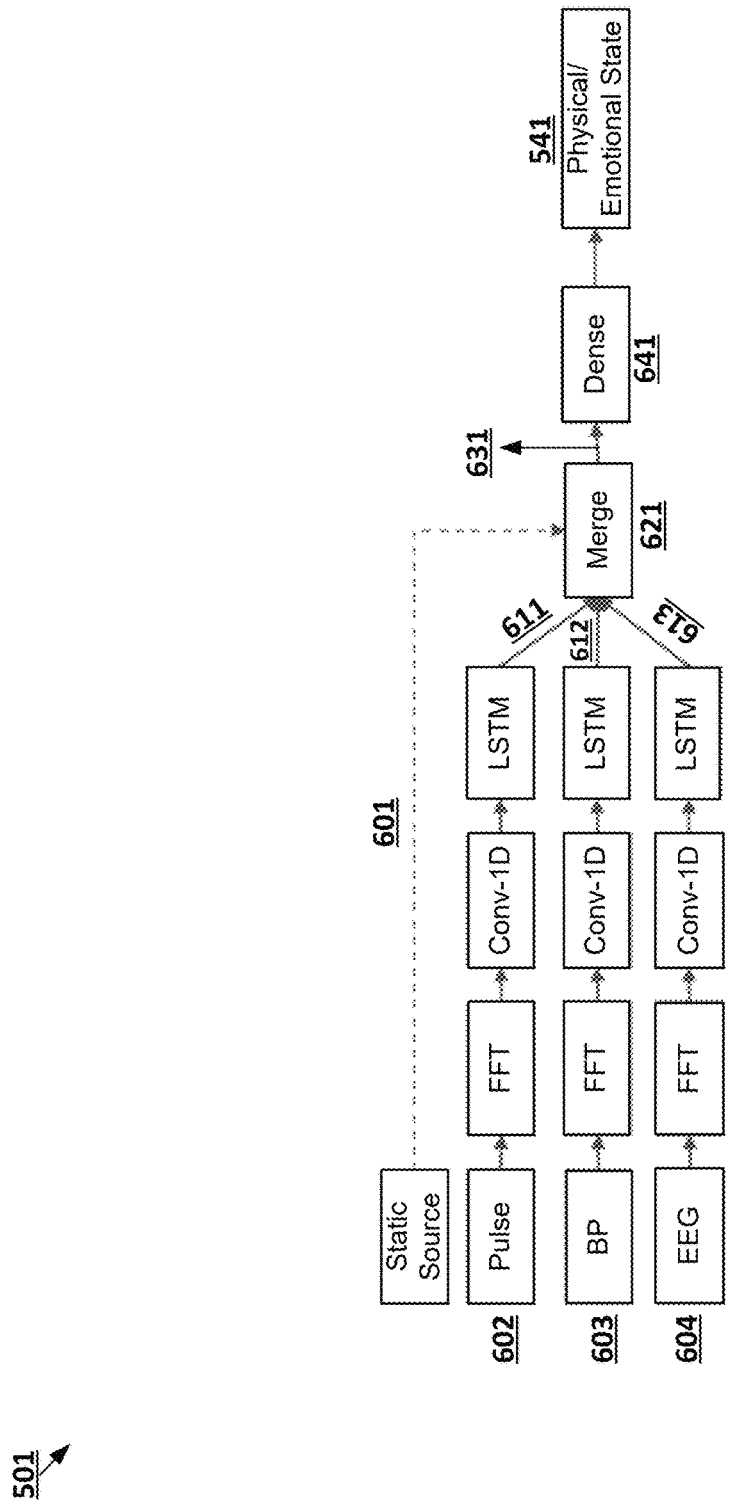
Figure 7:
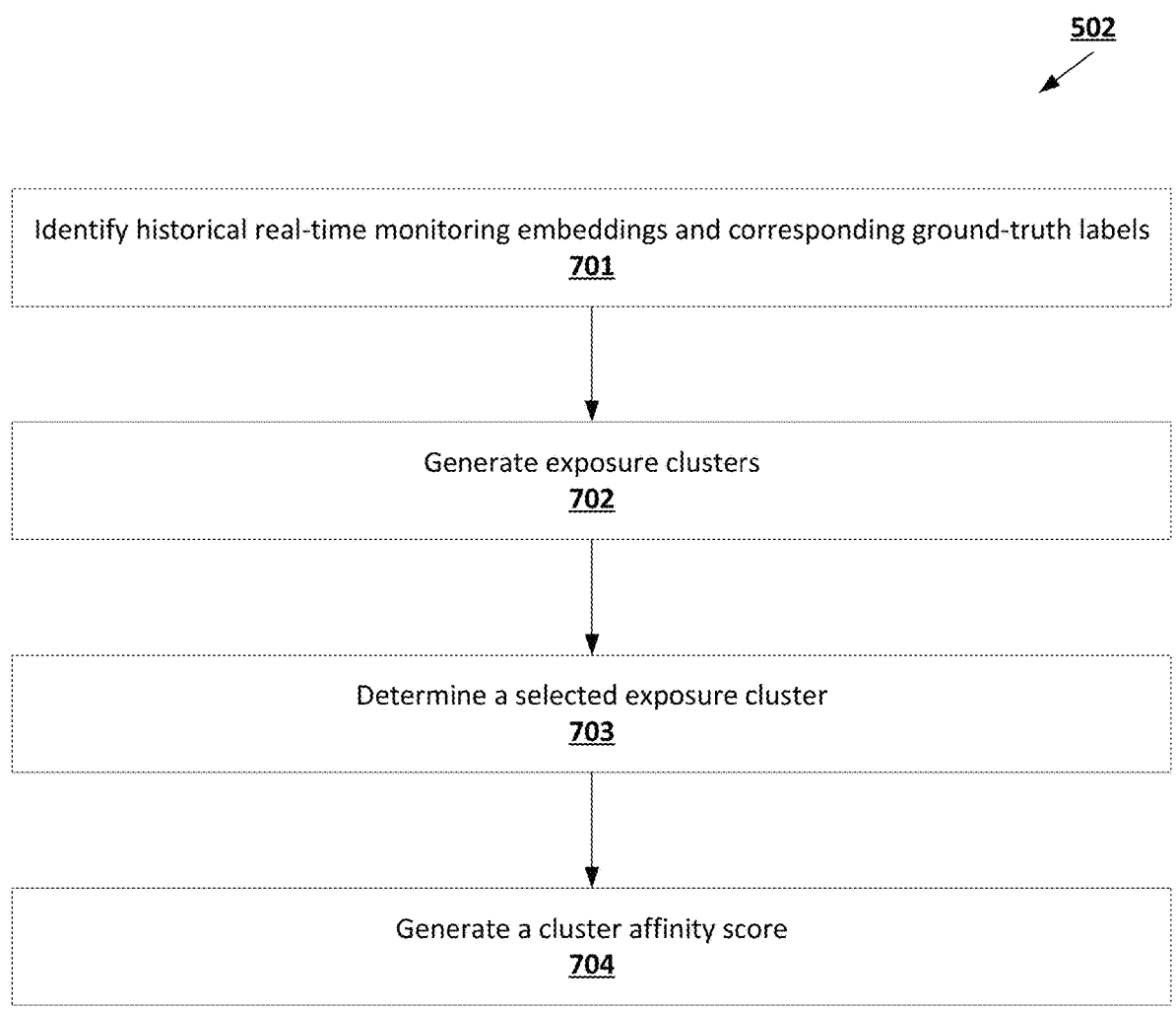
Figure 8:
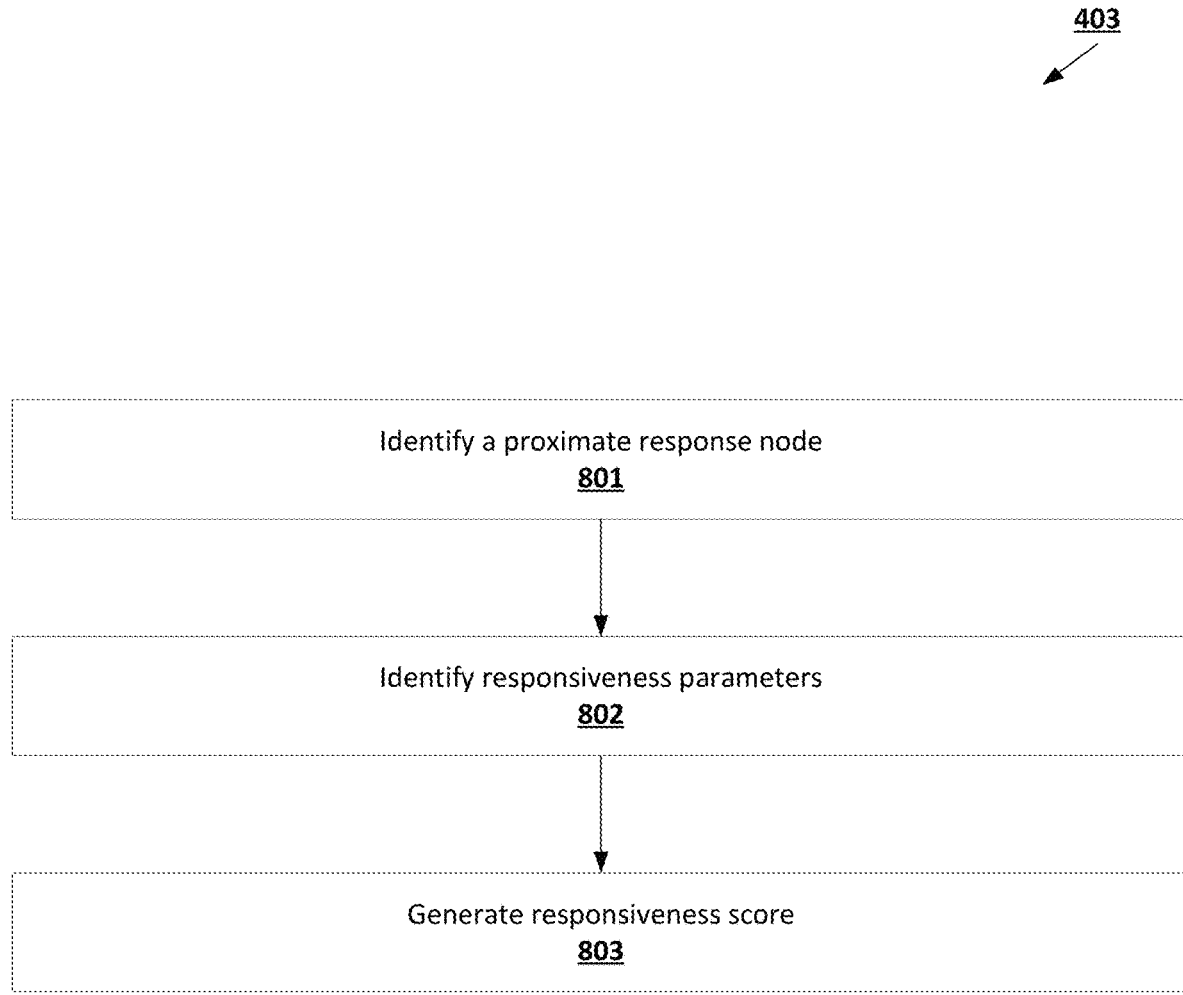
Figure 9:
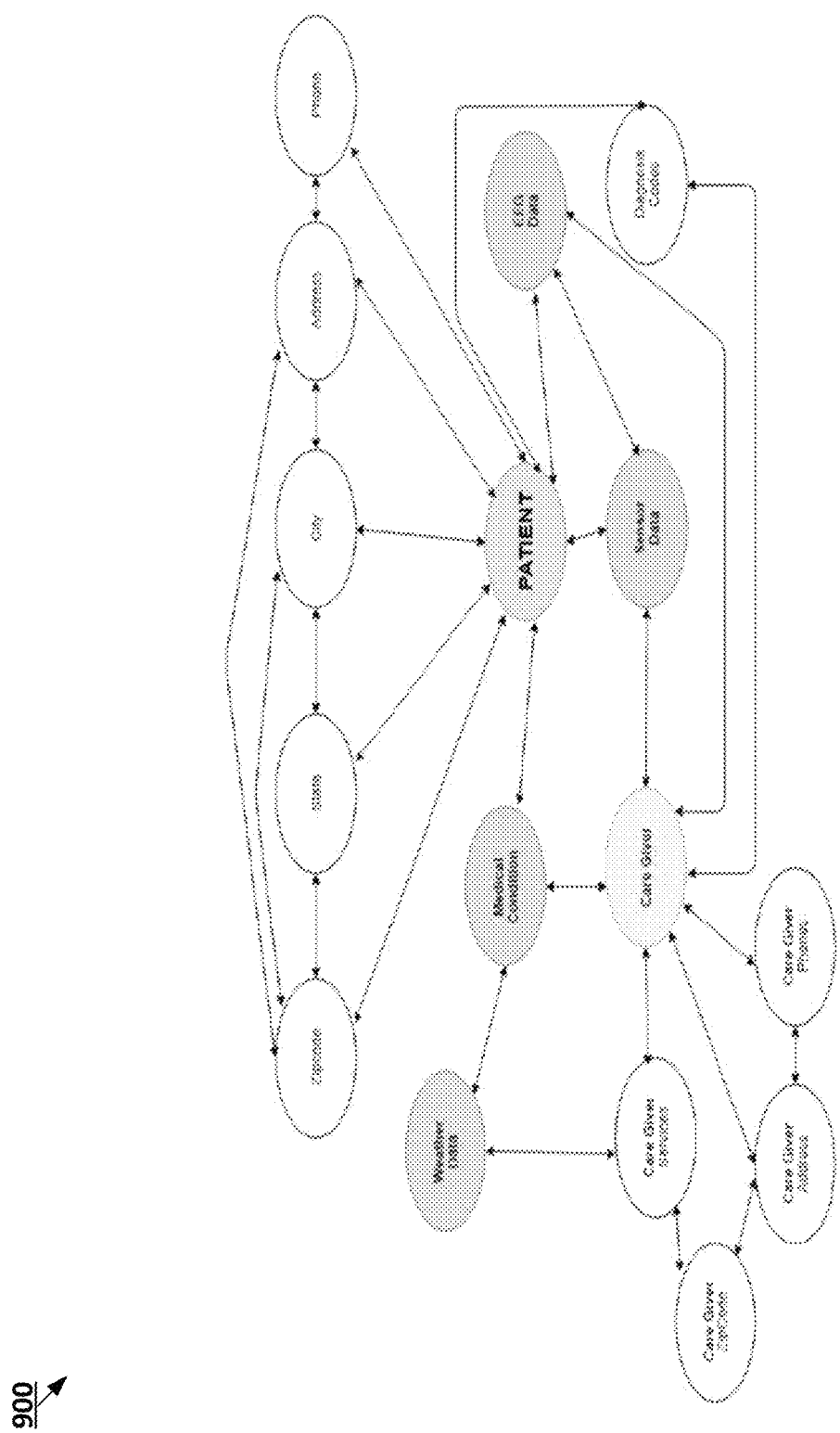
Figure 10:
Figure 11A:
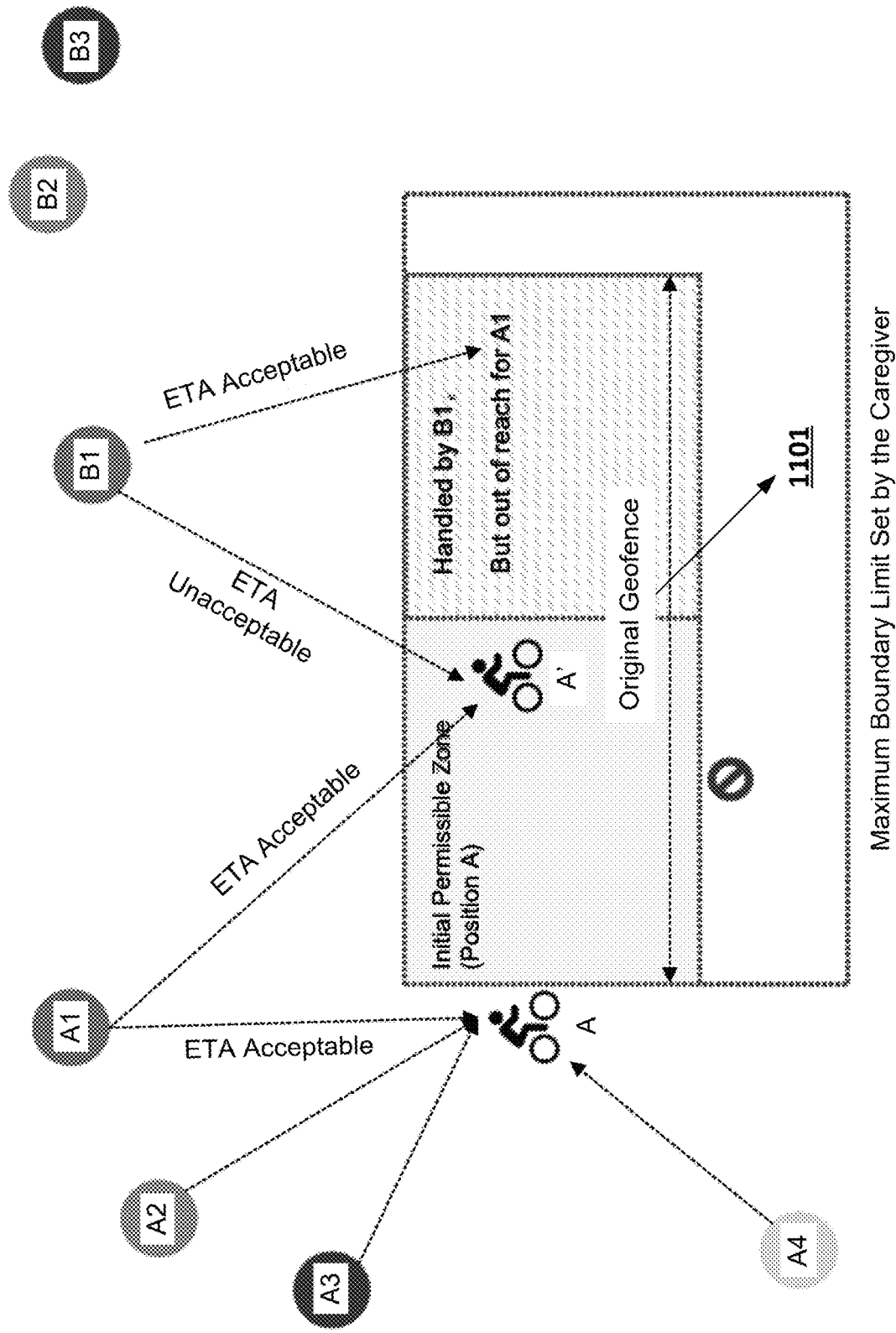
Figure 11B:
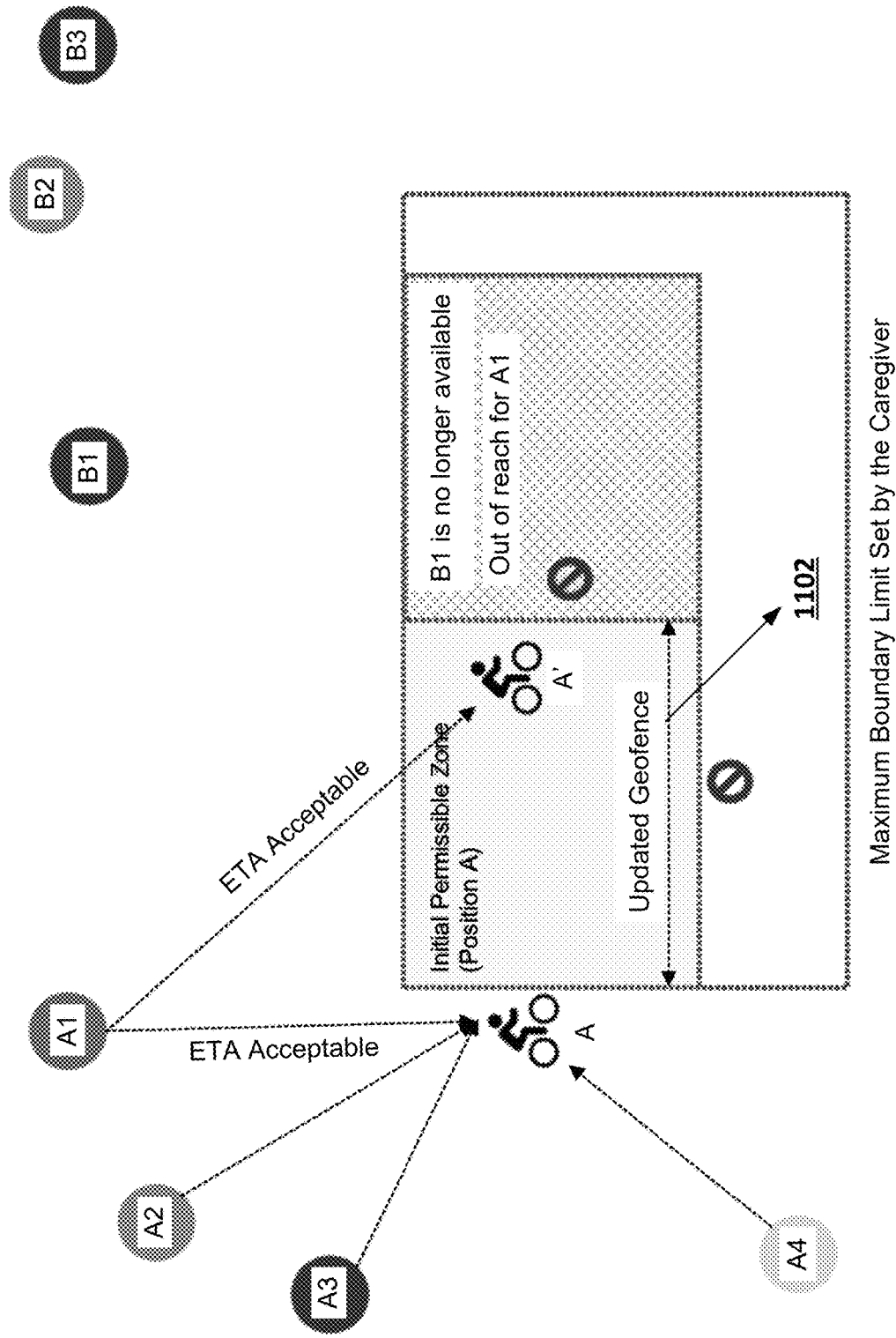
Figure 12:
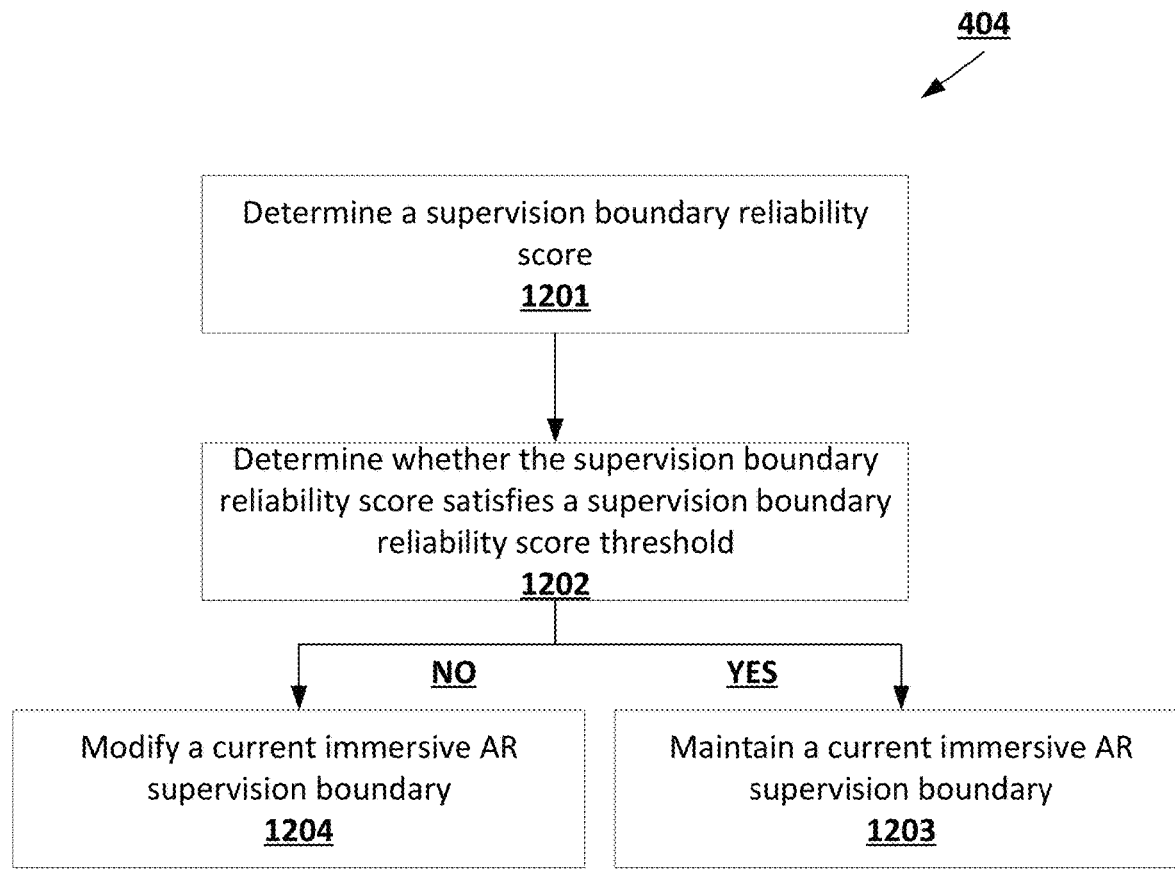
Figure 13:
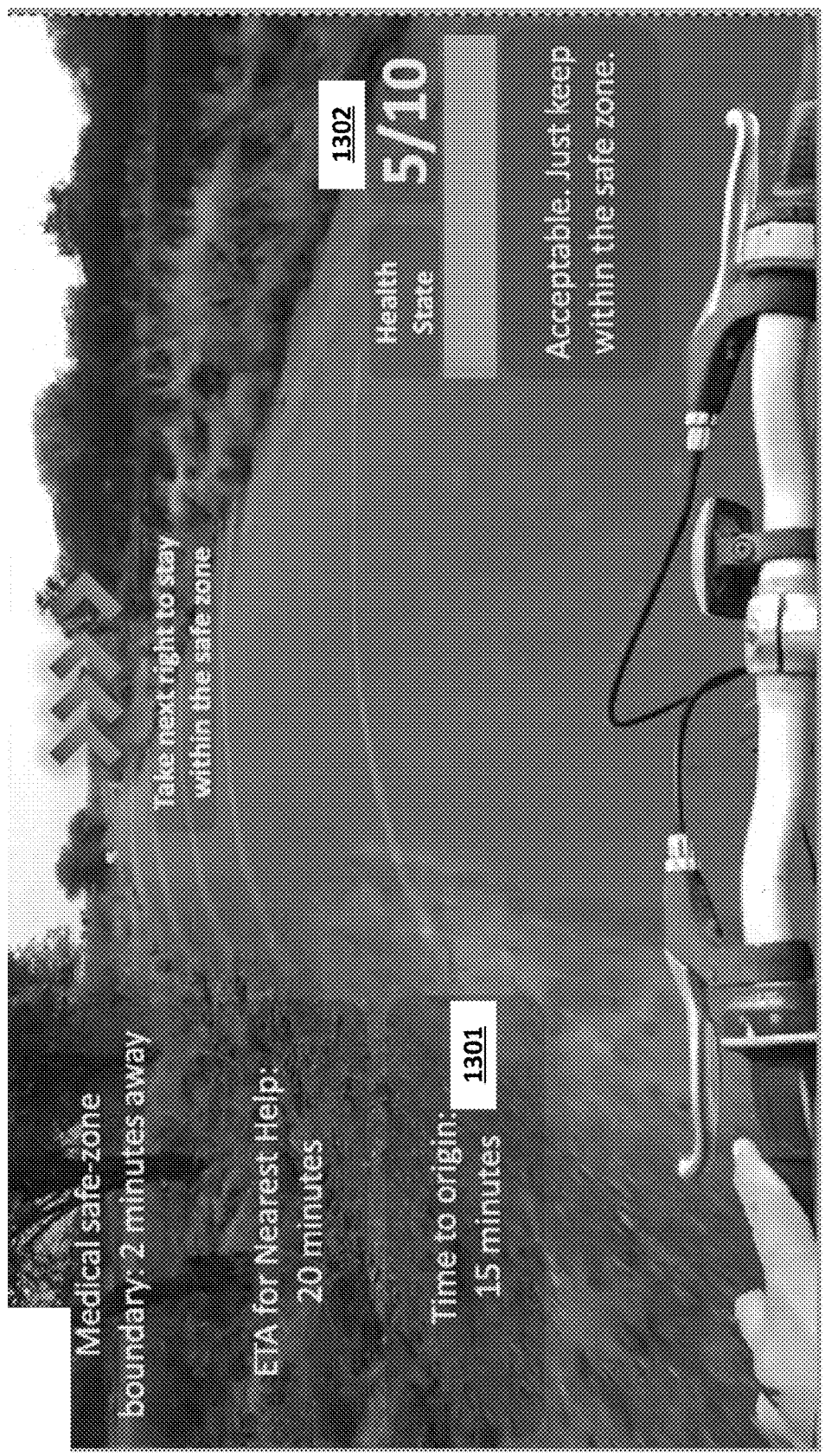
Figure 14:
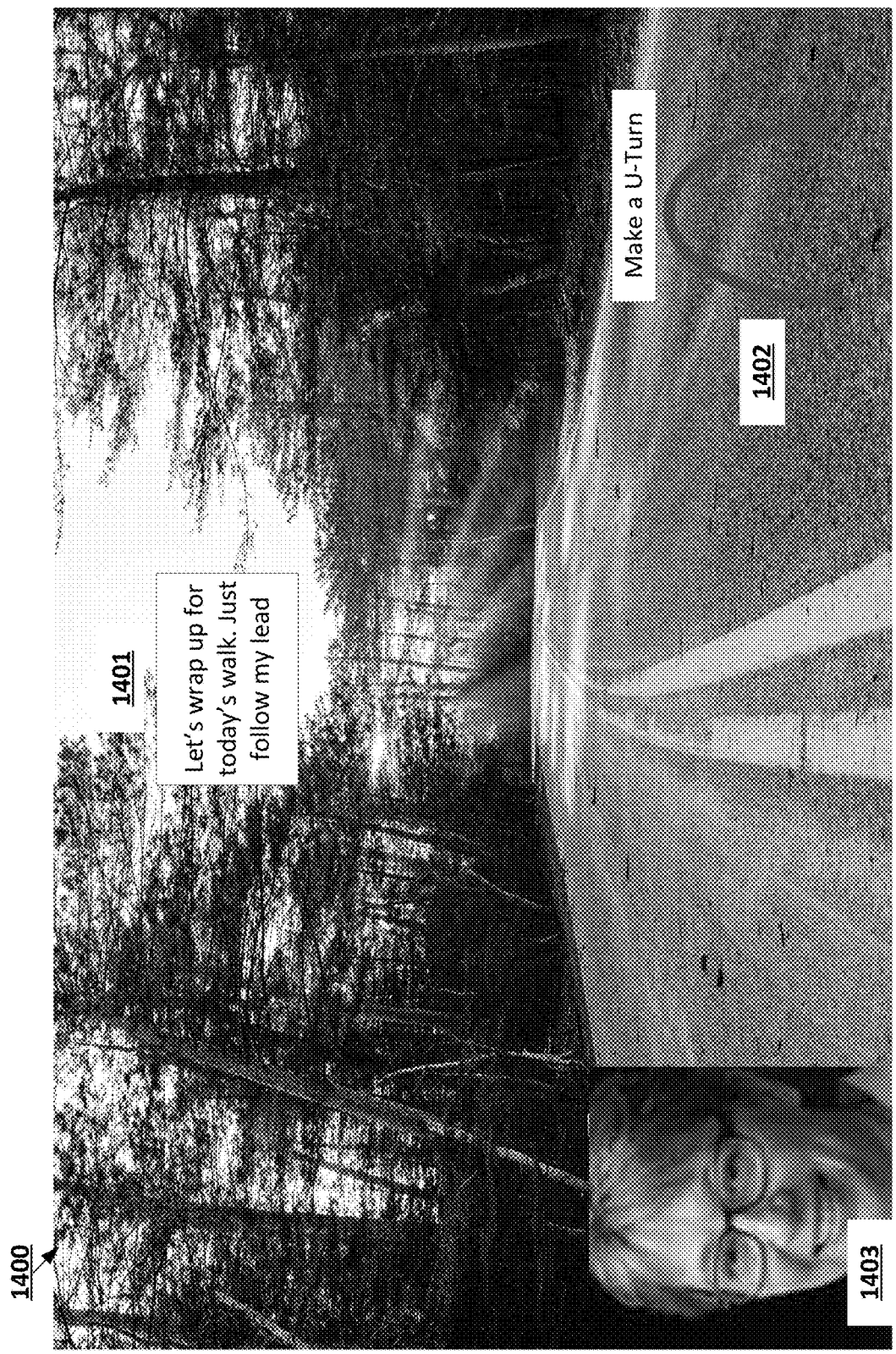
Figure 15A:
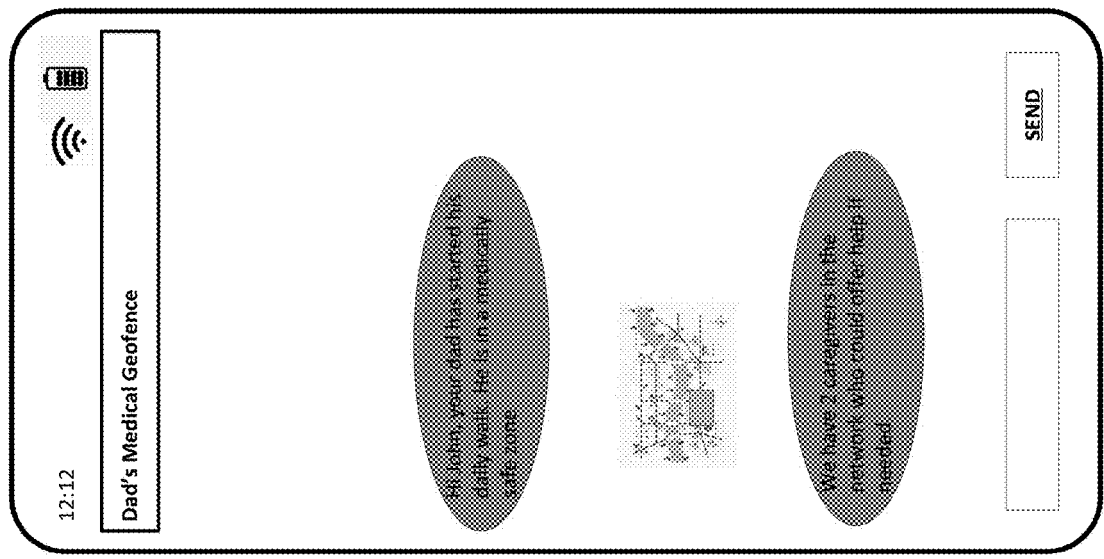
Figure 15B:
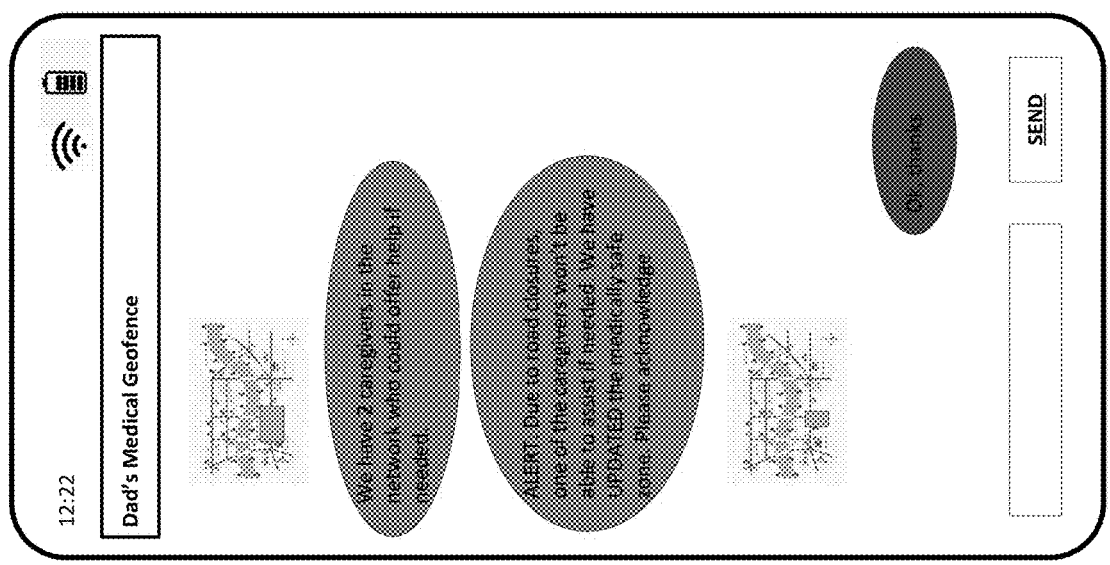

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example AR processing computing entity in accordance with some embodiments discussed herein;

FIG. 3 provides an example client computing entity in accordance with some embodiments discussed herein;

FIG. 4 provides a flowchart diagram of an example process for dynamically adjusting/updating an immersive AR supervision boundary for an AR device in accordance with some embodiments discussed herein;

FIG. 5 provides an operational example of an exposure classification machine learning framework in accordance with some embodiments discussed herein;

FIG. 6 provides an operational example of a real-time embedding machine learning model in accordance with some embodiments discussed herein;

FIG. 7 provides a flowchart diagram of an example process for performing steps/operations of an exposure clustering machine learning model in accordance with some embodiments discussed herein;

FIG. 8 provides a flowchart diagram of an example process for generating a responsiveness score for a proximate response node in accordance with some embodiments discussed herein;

FIG. 9 provides an operational example of a graph data object that describes relationships between users, providers, and condition categories in accordance with some embodiments discussed herein;

FIG. 10 provides an operational example of a table that describes responsiveness parameters and responsiveness scores for a set of response nodes in accordance with some embodiments discussed herein;

FIGS. 11A-11B provide an operational example of updating a current immersive AR supervision boundary based at least in part on the covered subset for the current immersive AR supervision boundary in accordance with some embodiments discussed herein;

FIG. 12 provides a flowchart diagram of an example process for updating a current immersive AR supervision boundary in accordance with some embodiments discussed herein;

FIG. 13 provides an operational example of an AR interface that is generated based at least in part on geographic marker data for an immersive AR supervision boundary in accordance with some embodiments discussed herein;

FIG. 14 provides an operational example of an AR interface that is generated based at least in part on navigational data and a navigator visualization profile for an immersive AR supervision boundary in accordance with some embodiments discussed herein; and FIGS. 15A-15B provides operational example of supervision-boundary-related notifications for two immersive AR supervision boundaries in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to AR processing, one of ordinary skill in the art will recognize that the disclosed concepts can be used to perform other types of data analysis.

I. Overview and Technical Advantages

Various embodiments of the present invention address technical advantages associated with resource usage efficiency of generating an immersive AR supervision boundary (e.g., geofence, care boundary/zone/area, guardian boundary/zone/area, medically safe boundary/zone/area, medically recommended boundary/zone/area, happy boundary/zone/area, medical comfort boundary/zone/area, safe boundary/zone/area, and/or the like) for an AR software application. Various existing AR solutions generate immersive AR supervision boundaries using a large image/video data captured from an environment of the AR user. Transmitting such image/video data is typically burdensome for computer networks that connect AR devices to AR processing server systems, storing such image/video data is typically burdensome for storage resources of AR devices and AR processing server, and/or processing such image/video is typically burdensome for computational resources of AR processing servers. To address the noted challenges, various embodiments of the present invention introduce machine learning techniques that enable using predictive signals obtained from location-based data and predictive signals obtained from sensory/monitoring data other than image/video data to generate and dynamically maintain immersive AR supervision boundaries. In this way, various embodiments reduce or eliminate the need for transmitting, storing, and/or processing large image/video data to generate immersive AR supervision boundaries in AR software applications, thus improving resource usage efficiency of generating an immersive AR supervision boundary for an AR software application.

Various embodiments of the present invention make important technical contributions to improving resource-usage efficiency of post-prediction systems by using exposure classifications to set the number of allowed computing entities used by the noted post-prediction systems and thus perform operational load balancing for the post-prediction systems (e.g., for post-prediction systems configured to perform automated audit operations on a set pf AR processing systems). For example, in some embodiments, a predictive data analysis computing entity determines D exposure classifications for D AR devices. Then, the count of D AR devices that are associated with an affirmative exposure classification, along with a resource utilization ratio for each AR device, can be used to predict a predicted number of computing entities needed to perform post-prediction processing operations with respect to the D AR devices. For example, in some embodiments, the number of computing entities needed to perform post-prediction processing operations (e.g., automated audit operations) with respect to D AR devices can be determined based at least in part on the output of the equation: $R=\text{ceil}(\Sigma_k^{k=K} ur_k)$, where R is the predicted number of computing entities needed to perform post-prediction processing operations with respect to the D AR devices, ceil(.) is a ceiling function that returns the closest integer that is greater than or equal to the value provided as the input parameter of the ceiling function, k is an index variable that iterates over K AR devices among the D AR devices that are associated with affirmative exposure classifications, and $ur_k$ is the estimated resource utilization ratio for a kth AR device that may be determined based at least in part on a count of iterative supervision boundary update routine iterations performed by the AR device. In some embodiments, once R is generated, a predictive data analysis computing entity can use R to perform operational load balancing for a server system that is configured to perform post-prediction processing operations with respect to D AR devices. This may be done by allocating computing entities to the post-prediction processing operations if the number of currently-allocated computing entities is below R, and deallocating currently-allocated computing entities if the number of currently-allocated computing entities is above R.

An exemplary application of various embodiments of the present invention relates to dynamically maintaining a virtual supervision boundary around a user. Such dynamic virtual geofencing may be used for users prone to wandering, such as users with Alzheimer's disease and/or other diseases. The dynamic supervision boundary encompassed area may be dynamically/adaptively updated/adjusted/maintained based at least in part on various risk factors including user mental and/or physical state, proximity to eligible caregivers, location, environmental conditions (e.g., weather, temperature, time of day, etc.), population density of the area, number of past visits, and/or like. In some embodiments, an AR processing computing entity may be configured to determine an initial supervision boundary with a supervision boundary radius around a user based at least in part on various risk factors, such as current user mental and/or physical state, proximity to eligible caregivers, location, current and/or predicted environmental conditions (e.g., weather, temperature, time of day, etc.), population density of the area, number of past visits, and/or like. Patient electronic medical record (EMR) data may also be used.

In some embodiments, an AR processing computing entity may receive sensor data from sensors (e.g., cellphone, heart rate monitors, blood pressure monitors, skin patch monitors, electroencephalogram (EEG) headphones, and/or the like. The AR processing computing entity may analyze received sensors data to estimate a user mental state score and/or user physical state score. The AR processing computing entity may determine a user mental state score based at least in part on EEG data, user movement patterns, and/or the like. The AR processing computing entity may determine a user physical state score based at least in part on the user's breathing pattern, pulse, heart rate variability, EMR data, etc. The AR processing computing entity may also employ one or more user state determination machine learning models (e.g., user mental state determination machine learning models, user physical state determination machine learning models, and/or the like). The one or more machine learning models may each be configured to process one or more types of sensor data. An aggregated user state determination machine learning model may be configured to aggregate the one or more outputs from each of the one or more user state determination machine learning models and the aggregated user state score may be configured to determine a physical user state score and/or emotional user state score for the user.

In some embodiments, the AR processing computing entity may classify a user mental state based at least in part on the physical user state score and/or emotional user state score and determine a confidence score. The AR processing computing entity may employ one or more intervention clustering machine learning models which may employ clustering techniques (e.g., k-means clustering) to determine an intervention classification indicative of whether or not user intervention is required. Furthermore, one or more affinity scores may be determine for each of one or more candidate intervention classification. In the event an "intervention needed" intervention classification is determined, a caregiver may be notified. In the event an "intervention needed" intervention classification is determined, a caregiver profile ranking may be determined. The AR processing computing entity may identify one or more caregivers within proximity of the user and determine a ranking for each identified provider based at least in part on one or more of an estimated time of arrival (ETA), circumstantial compatibility (i.e., type of user condition, anticipated medical support, etc.), previous ranking based at least in part on prior user experience, caregiver responsiveness index, and/or the like. In some embodiments, the AR processing computing entity may determine a current health risk score for the user based at least in part on the user mental state score, user physical state score, one or more caregiver parameters (e.g., ETA of nearest caregiver), and current and/or predicted environmental conditions.

In some embodiments, the AR processing computing entity modify the supervision boundary radius based at least in part on the current health risk score. The radius of the supervision boundary may be modified such that in situations where the user is or is anticipated to be in a negative emotional and/or physical state, poor environmental conditions, and/or distant caregiver ETA, the radius of the supervision boundary may be decreased such that the supervision boundary is more sensitive to user mobility outside of the supervision boundary radius. In an instance the user wanders outside the supervision boundary radius, one or more notifications may be sent to one or more users and/or caregivers to alert them of the location of the user. A supervision boundary radius $R_{geofence}$ may be determined based at least in part on the following equation: $R_{geofence}=f(R_{physical}, R_{mental}, R_{caregiver-readiness})$, where $R_{physical}$ is the user physical state score, $R_{mental}$ is the user mental state score, and $R_{caregiver-readiness}$ is the caregiver readiness score for the selected caregiver.

In some embodiments, the AR processing computing entity (i) determines a physical user state score for a user using one or more user physical state determination machine learning models, (ii) determines a mental user state score for the user using one or more user mental state determination machine learning models, (iii) determines an intervention classification based at least in part on the physical user state score and the mental user state score, (iv) in an instance in which the intervention classification describes that an intervention is needed, determines a caregiver readiness score for one or more candidate caregivers based at least in part on the physical user state score and the mental user state score, (iv) determines a current health risk score based at least in part on the physical user state score, the mental user state score, and the caregiver readiness score, and (v) modifies a user supervision boundary radius based at least in part on the current health risk score for the user.

II. Definitions of Certain Terms

The term "immersive AR supervision boundary" may refer to a data construct that describes a geographic region surrounding a current AR device location of an AR device. In some embodiments, the immersive AR supervision boundary is dynamically updated over time and across a set of defined update timesteps (e.g., a set of periodic update timesteps). In some embodiments, the latest immersive AR supervision boundary at each update timestep is used to perform one or more AR interaction actions relation to the AR device and/or in relation to one or more client computing entities. For example, in some embodiments, the latest immersive AR supervision boundary at each time is used to provide navigational instructions to a user of the AR device and via the AR device. As another example, in some embodiments, the latest immersive AR supervision boundary at each update timestep is used to display geographic marker data describing boundaries of the geographic region associated with the latest immersive AR supervision boundary to a user of the AR device and via the AR device. As yet another example, in some embodiments, the latest immersive AR supervision boundary at each update timestep is used to provide supervision boundary modification notification data to one or more agent computing entities associated with monitoring agents (e.g., custodians/guardians) of a user of the AR device each time the latest immersive AR supervision boundary is different from a prior immersive AR supervision boundary. As a further example, in some embodiments, the latest immersive AR supervision boundary at each update timestep is used to provide supervision boundary notification data to one or more responsive computing entities associated with one or more proximate response nodes that are covered by the latest updated immersive AR supervision boundary.

The term "real-time monitoring data object" may refer to a data construct that describes most-recently-received monitoring data associated with a set of sensors that are configured to monitor conditions (e.g., physiological conditions, mental conditions, environmental conditions, and/or the like) of a user of an AR device. In some embodiments, the set of sensors include at least one of sensors included as part of the AR device or sensors included as part of other computing devices that are attached to and/or carried by the user of the AR device. Examples of such sensor devices include pulse rate monitoring devices, heart rate monitoring devices, body temperature monitoring devices, blood pressure monitoring devices, electroencephalography (EEG) monitoring devices, skin conductance monitoring devices, blood oxygen level (SpO2) monitoring devices, ambient temperature monitoring devices, wind intensity monitoring devices, humidity monitoring devices, visibility monitoring devices, and/or the like. In some embodiments, the real-time monitoring data object describes latest physiological monitoring data of a user of an AR device and latest environmental (e.g., weather) data of an environment of the user. In some embodiments, the real-time monitoring data object comprises N categorical real-time monitoring embedding vectors, where each categorical real-time monitoring embedding vector is a vector describing latest monitoring data associated with a corresponding real-time monitoring category.

The term "real-time monitoring category" may refer to a data construct that describes a category of sensory data that is monitored in real-time and/or in near-real-time. Examples of real-time monitoring categories include a pulse rate monitoring category, a heart rate monitoring category, a body temperature monitoring category, a blood pressure monitoring category, an electroencephalography (EEG) monitoring category, a skin conductance monitoring category, a blood oxygen level (SpO2) monitoring category, an ambient temperature monitoring category, a wind intensity monitoring category, a humidity monitoring category, a visibility monitoring category, and/or the like. For example, in some embodiments, a real-time monitoring data object comprises at least one of a pulse rate monitoring vector, a heart rate monitoring vector, a body temperature monitoring vector, a blood pressure monitoring vector, an electroencephalography (EEG) monitoring vector, a skin conductance monitoring vector, a blood oxygen level (SpO2) monitoring vector, an ambient temperature monitoring vector, a wind intensity monitoring vector, a humidity monitoring vector, a visibility monitoring vector, and/or the like.

The term "historical state data object" may refer to a data construct that describes historical condition data associated with a user of an AR device. For example, a historical state data object may describe one or more data entries inferred from an electronic medical record (EMR) of the user, such as data entries describing baseline physiological measurements for the user, data entries describing one or more preexisting conditions/ailments of the user, and/or the like. In some embodiments, the historical state data object describes at least one of a pulse rate baseline of the user, a heart rate baseline of the user, a body temperature baseline of the user, a blood pressure baseline of the user, an electroencephalography (EEG) baseline of the user, a skin conductance baseline of the user, a blood oxygen level (SpO2) baseline of the user, an ambient temperature baseline of the user environment, a wind intensity baseline of the user environment, a humidity baseline of the user environment, a visibility baseline of the user environment, and/or the like. In some embodiments, the historical state data object for a user of the AR device is converted to a fixed-dimensional vector representation called a static embedding that can then be used along with a set of categorical real-time monitoring embedding vectors for the AR device to generate a real-time monitoring embedding for the AR device.

The term "exposure classification" may refer to a data construct that describes an inferred/predicted determination about whether the user of an AR device is in need of interventions by one or more intervention providers (e.g., one or more medical providers) associated with one or more response nodes. For example, in some embodiments, the real-time monitoring data object of an AR device and a historical state data object of the user of the AR device may describe that the conditions of the user are in such a state as to require provider assistance. In some embodiments, when an AR processing computing entity determines that the user of the AR device is in need of interventions by one or more intervention providers, the exposure classification for the AR device is an affirmative exposure classification. In some embodiments, when an AR processing computing entity determines that the user of the AR device is not in need of interventions by one or more intervention providers, the exposure classification for the AR device is a negative exposure classification. In some embodiments, the exposure classification of an AR device is determined by processing the real-time monitoring data object associated with the AR device and the historical state data object associated with the AR device using an exposure classification machine learning framework, as further described below. In some embodiments, in addition to describing that the user of the AR device is in need of interventions by one or more intervention providers, the exposure classification for the AR device may further describe the reason for the noted intervention need (e.g., heart failure, disturbed mental state, and/or the like).

The term "exposure classification machine learning framework" may refer to a data construct that describes parameters, hyper-parameters, and/or defined operations of a machine learning model that is configured to generate an exposure classification for an AR device based at least in part on the real-time monitoring data object associated with the AR device and the historical state data object associated with the AR device. In some embodiments, the exposure classification machine learning framework comprises a real-time embedding machine learning model, an exposure clustering machine learning model, and a cluster mapping machine learning model, where: (i) the real-time embedding machine learning model is configured to generate a real-time monitoring embedding for the AR device based at least in part on the real-time monitoring data object and the historical state data object, (ii) the exposure clustering machine learning model is configured to generate a selected exposure cluster for the monitored individual based at least in part on the real-time monitoring embedding for the AR device, and (iii) the exposure clustering machine learning model is configured to generate a selected exposure cluster for the monitored individual based at least in part on the real-time monitoring embedding for the AR device. In some embodiments, inputs to the exposure classification machine learning framework comprise at least one of the following: (i) a set of categorical real-time monitoring embedding vectors for an input AR device as determined based at least in part on the real-time monitoring data object for the input AR device, and (ii) a fixed-dimensional vector representation called a static embedding that is determined based at least in part on the historical state data object for the input AR device. In some embodiments, outputs of the exposure classification machine learning framework comprise a vector describing a selected exposure classification for an input AR device, for example a vector describing a classification score for each candidate exposure classification of a set of candidate exposure classifications for the input AR device (where the exposure classification for the input AR device may be determined based at least in part on the candidate exposure classification having a maximal classification score). In some embodiments, outputs of the exposure classification machine learning framework comprise an atomic value and/or a vector describing an identifier of the selected exposure classification for an input AR device.

The term "real-time embedding machine learning model" may refer to a data construct that describes parameters, hyper-parameters, and/or defined operations of a machine learning model that is configured to generate a real-time monitoring embedding for the AR device based at least in part on the real-time monitoring data object associated with the AR device and the historical state data object associated with the AR device. In some embodiments, the real-time embedding machine learning model is a supervised machine learning model that is trained based at least in part on historical intervention outcome data associated with a set of historical monitoring sessions (e.g., historical intervention outcome data describing whether historical monitoring sessions were subsequently determined to be in need of intervention). In some embodiments, the real-time monitoring data object is used to generate N categorical real-time monitoring vector for N real-time monitoring categories. In some of the noted embodiments, the real-time embedding machine learning model is configured to: (i) generate, for each real-time monitoring category, a categorical real-time monitoring embedding vector based at least in part on the categorical real-time monitoring vector for the real-time monitoring category, and (ii) combine the N categorical real-time monitoring embedding vectors for the N real-time monitoring categories and a static embedding for the AR device to generate the real-time monitoring embedding for the AR device. In some embodiments, the real-time embedding machine learning model comprises N sequential processing sub-models each associated with a real-time monitoring category of N monitoring categories.

The term: "sequential processing sub-model" may refer to a data construct that describes parameters, hyper-parameters, and/or defined operations of a set of machine learning operations that are collectively configured to process the categorical real-time monitoring vector for a corresponding real-time monitoring category and a sequential model hidden state vector for the sequential processing sub-model to generate a categorical real-time monitoring embedding vector for the corresponding real-time monitoring category. For example, a sequential processing sub-model that is associated with a heart rate monitoring category may process a fixed-dimensional vector describing latest heart rate data associated with a user of an AR device along with a hidden state vector for the sequential processing sub-model to generate a categorical real-time monitoring embedding vector for the heart rate monitoring category. As another example, a sequential processing sub-model that is associated with an EEG monitoring category may process a fixed-dimensional vector describing latest heart rate data associated with a user of an AR device along with a hidden state vector for the sequential processing sub-model to generate a categorical real-time monitoring embedding vector for the EEG monitoring category. In some embodiments, each sequential processing sub-model comprises a recurrent neural network component (e.g., a conventional recurrent neural network component, a long short term memory network component, a gated recurrent unit network component, and/or the like) that is configured to, during each recurrent neural network timestep, generate input data that is generated based at least in part on the categorical real-time monitoring vector for a corresponding real-time monitoring category and a hidden state vector to generate output data comprising an updated hidden state vector. In some embodiments, during an initial recurrent neural network timestep, the hidden state vector for the recurrent neural network component may be a predefined initialized hidden state vector (e.g., a predefined initialized hidden state vector having all zero values). In some embodiments, during each post-initial recurrent neural network timestep, the hidden state vector for the recurrent neural network component may be the updated hidden state vector generated by the recurrent neural network component during a preceding recurrent neural network timestep of the post-initial recurrent neural network timestep. In some embodiments, the input to the recurrent neural network component during each recurrent neural network timestep is generated by: (i) performing one or more domain conversion operations (e.g., one or more Fast Fourier Transform operations) on the categorical real-time monitoring vector for the recurrent neural network timestep to generate a domain-converted embedding, (ii) performing one or more convolutional neural network operations (e.g., one or more one-dimensional convolutional neural network operations) on the domain-converted embedding to generate a convolutional embedding, and (iii) generating the input based at least in part on the convolutional embedding.

The term "exposure clustering machine learning model" may refer to a data construct that describes parameters, hyper-parameters, and/or defined operations of a machine learning model that is configured to generate a selected exposure cluster for the AR device based at least in part on the real-time monitoring embedding for the AR device and a cluster affinity score for the real-time monitoring embedding of the AR device relative to the selected exposure cluster. In some embodiments, the exposure clustering machine learning model is configured to: (i) receive a set of historical real-time monitoring embeddings each associated with a ground-truth label (e.g., a ground-truth label describing whether the user of the AR device was confirmed to be in need of intervention at a time associated with the corresponding historical real-time monitoring embedding), (ii) process the set of historical real-time monitoring embeddings and the corresponding set of ground-truth labels using a clustering machine learning routine (e.g., a k-means clustering routine) to generate a set of (e.g., a predefined number of, a dynamically determined number of, and/or the like) exposure clusters each comprising a subset of the historical real-time monitoring embeddings, (iii) determine the selected exposure cluster for the AR device from the set of exposure clusters, (iv) determine the cluster affinity score for the real-time monitoring embedding of the AR device relative to the selected exposure cluster based at least in part on a measure (e.g., a Silhouette measure) that describes an inferred/predicted degree of relatedness between the real-time monitoring embedding and the selected exposure cluster. In some embodiments, inputs to the exposure clustering machine learning model include a vector describing the real-time monitoring embedding for an input AR device, while outputs of the exposure clustering machine learning model include a vector and/or an atomic value describing the selected exposure cluster for the AR device. In some embodiments, the exposure clustering machine learning model is trained based at least in part on a set of historical real-time monitoring embeddings each associated with a ground-truth label, as further described below.

The term historical real-time monitoring embedding" may refer to a data construct that describes a real-time monitoring embedding that is generated by the real-time embedding machine learning model via processing a historical real-time monitoring data object (e.g., a historical real-time monitoring data object received during a previous update timestep for the current user of the AR device, a historical real-time monitoring data object received during a previous AR processing session for the current user, a historical real-time monitoring data object received in the past for a different user such as a user that has the same demographic profile and/or preexisting condition profile as the current user). In some embodiments, the ground-truth label of a historical real-time monitoring embedding describes whether the user of the AR device was confirmed (e.g., based at least in part on subsequent medical evaluation result data) to be in need of intervention at a time associated with a corresponding historical real-time monitoring embedding.

The term "exposure cluster" may refer to a data construct that describes a subset of the historical real-time monitoring embeddings that are inferred/predicted to be related. In some embodiments, each exposure cluster is associated with a ground-truth label that describes at least one of the following: (i) whether strong association of a real-time monitoring data object for an update timestep with the exposure cluster describes that the user of the AR device is in need of intervention during a time associated with the update timestep, (ii) whether strong association of a real-time monitoring data object for an update timestep with the exposure cluster describes that the user of the AR device is in need of intervention for a particular reason (e.g., for heart failure, for disturbed mental state, and/or the like) during a time associated with the update timestep, or (iii) whether strong association of a real-time monitoring data object for an update timestep with the exposure cluster describes that the user of the AR device is in need of intervention of a particular kind (e.g., family member attention, social worker attention, mouth-to-mouth recitation, insulin injection, and/or the like) during a time associated with the update timestep.

The term "cluster mapping machine learning model" may refer to a data construct that describes parameters, hyper-parameters, and/or defined operations of a machine learning model that is configured to map the selected exposure cluster for the AR device to the exposure classification for the AR device based at least in part on the cluster affinity score. In some embodiments, the inputs to the cluster mapping machine learning model include one or more input vectors describing a selected exposure cluster and a cluster affinity score. In some embodiments, outputs of the cluster mapping machine learning model comprise a vector describing a selected exposure classification for an input AR device, for example a vector describing a classification score for each candidate exposure classification of a set of candidate exposure classifications for the input AR device (where the exposure classification for the input AR device may be determined based at least in part on the candidate exposure classification having a maximal classification score). In some embodiments, outputs of the cluster mapping machine learning model comprise an atomic value describing an identifier of the selected exposure classification for an input AR device. In some embodiments, if the cluster affinity score satisfies (e.g., exceeds) a cluster affinity score threshold, the cluster mapping machine learning model determines that the AR device is associated with an exposure classification that is associated with the ground-truth label for the selected exposure cluster. In some embodiments, if the cluster affinity score fails to satisfy (e.g., fails to exceed) a cluster affinity score threshold, the cluster mapping machine learning model applies one or more boundary classification rules to generate the exposure classification. For example, in some embodiments, if cluster affinity score fails to satisfy (e.g., fails to exceed) a cluster affinity score threshold, the cluster mapping machine learning model may determine an affirmative exposure classification if the reachability score for at least one response node relative to the current AR device location satisfies a reachability score threshold (e.g., where the reachability score may be determined based at least in part on an estimated arrival duration of a response provider from a response node location of the response node to the current AR device of the AR device).

The term "response node" may refer to a data construct that describes feature data (e.g., responsiveness parameter data, location data, availability data, expertise data, experience data, and/or the like) associated with a service provider (e.g., a caregiver). In some embodiments, the location (e.g., the office location, the location determined in real-time and/or near-real-time using for example Geographic Positioning System (GPS) capabilities, and/or the like) of a service provider is referred to as the node location or the response node location for the corresponding response node. In some embodiments, when a response node survives one or more filtering criteria for an AR device, the response node is classified as a proximate response node for the noted AR device.

The term "responsiveness parameter" may refer to a data construct that describes a feature related to response speed and/or response effectiveness of a provider (e.g., a caregiver) associated with a corresponding response node (e.g., a corresponding proximate response node for an AR device). In some embodiments, the responsiveness parameters for a response node include a real-time reachability score (e.g., an estimated arrival duration) that describes a speed/ease/duration of traveling from a node location (e.g., a provider office location, a caregiver office location, a hospital location, and/or the like) for the response node and the current AR device location for the AR device, where the real-time reachability score may be determined based at least in part on mobility data (e.g., traffic data, road closure data, and/or the like) associated with various paths between the node location and the current AR device location. In some embodiments, the responsiveness parameters for a response node include a historical experience quality parameter that describes a statistical distribution measure for previous rankings of experience quality (e.g., previous patient experience rankings) for the provider that is associated with the response node by the user of the AR device and/or by users having a similar demographic profile as the user of the response node. In some embodiments, the responsiveness parameters for a response node include a historical responsiveness parameter that describes a statistical distribution measure of responsiveness quality by the provider associated with the response node (e.g., a caregiver responsiveness index). In some embodiments, the responsiveness parameters for a response node include a circumstantial capability parameter that describes a Boolean value indicating whether the provider associated with the response node is available for response at a time associated with a current update timestep.

The term responsiveness score" may refer to a data construct that describes an estimated/predicted likelihood that the provider associated with a response node will provide effective and timely response in the event of the occurrence of a response need scenario (e.g., a heart failure by the user of the AR device). In some embodiments, the responsiveness score for a response node is generated by processing the responsiveness parameters associated with the response using a responsiveness scoring machine learning model, as further described below.

The term "responsiveness scoring machine learning model" may refer to a data construct that describes parameters, hyper-parameters, and/or defined operations of a machine learning model that is configured to process responsiveness score for a response node to generate a responsiveness score for the response node. In some embodiments, the responsiveness score for a response node is configured to process, at least in part, M or M−1 responsiveness parameters (e.g., all responsiveness parameters, all responsiveness parameters other than an index responsiveness parameter such as the circumstantial capability parameter, and/or the like) for a response node and M or M−1 corresponding responsiveness parameter weights for the M or M−1 responsiveness parameters to generate the responsiveness score for the response node. In some embodiments, at least a subset of the M or M−1 corresponding responsiveness parameter weights are determined based at least in part on trained parameters of the responsiveness scoring machine learning model. In some embodiments, at least a subset of the M or M−1 corresponding responsiveness parameter weights are determined based at least in part on predefined hyperparameters of the responsiveness scoring machine learning model. In some embodiments, the responsiveness scoring machine learning model comprises one or more neural network layers, such as one or more neural network fully-connected layers and/or one or more feedforward neural network layers. In some embodiments, the responsiveness scoring machine learning model comprises one or more regression layers, such as one or more linear regression layers and/or one or more one or more polynomial regression layers. In some embodiments, inputs to the responsiveness scoring machine learning model include a vector describing one or more responsiveness parameters of an input response node. In some embodiments, outputs of the responsiveness scoring machine learning model include a vector and/or an atomic value describing the responsiveness score generated by the responsiveness scoring machine learning model for the input response node. In some embodiments, the responsiveness scoring machine learning model is trained based at least in part on historical data describing ground-truth responsiveness evaluation results of a set of providers, such as ground-truth responsiveness evaluation results determined using subject-matter-expertise audit evaluations and/or based at least in part on regulatory audit evaluations.

The term "supervision boundary reliability score" may refer to a data construct that describes an inferred/predicted measure of reliability of an immersive AR supervision boundary in ensuring effective and timely response to a user of an AR device in the event of a response need scenario given the proximate response nodes that cover the immersive AR supervision boundary. In some embodiments, the supervision boundary reliability score for an immersive AR supervision boundary describes (e.g., is determined based at least in part on) at least one of the following: (i) the number of proximate response nodes for a corresponding AR device that are in a covered subset of proximate response nodes for the immersive AR supervision boundary, (ii) the responsiveness scores for the proximate response nodes in the covered subset, (iii) the real-time reliability scores for the proximate response nodes in the covered subset, or (iv) the supervision boundary reachability scores for the proximate response nodes in the covered subset with respect to the immersive AR supervision boundary. In some embodiments, the covered subset for an immersive AR supervision boundary describes each proximate response node whose supervision boundary reachability scores with respect to the immersive AR supervision boundary satisfies (e.g., exceeds) a supervision boundary reliability score threshold. In some embodiments, the supervision boundary reliability score for an immersive AR supervision boundary is determined by performing the following operations: (i) converting the immersive AR supervision boundary into R equal-sized supervision boundary regions, (ii) for each region-node pair that comprises a region of the R supervision boundary regions and a proximate response node of the set of proximate response nodes that are in the covered subset for the immersive AR supervision boundary, computing a reachability score describing a speed/ease/duration of traveling from a node location (e.g., a provider office location, a caregiver office location, a hospital location, and/or the like) for the proximate response node to a centroid location of the supervision boundary region, (iii) for each supervision boundary region, determining a minimum reachability scores for all region-node pairs that are associated with the supervision boundary region, (iv) determining a summation of the minimum reachability scores, and (v) determining an inverse measure and/or a negation measure of the summation measure to generate the supervision boundary reliability score. In some embodiments, the supervision boundary reliability score for an immersive AR supervision boundary is determined based at least in part on an inverse and/or a negation of the output of equation $\iint \min_{N_1, \ldots, N_M} D(N_1, (x,y)) dy dx$, where $D(a,b)$ describes a reachability score for: (i) a node location of a proximate response node a node that is among the M proximate response nodes in the covered subset for immersive AR supervision boundary, with respect to (ii) the location b in the immersive AR supervision boundary.

The term "supervision boundary reachability score" may refer to a data construct that describes a speed/ease/duration of traveling from a node location (e.g., a provider office location, a caregiver office location, a hospital location, and/or the like) for a respective response node to a least reachable location of a respective immersive AR supervision boundary relative to the node location. In other words, the supervision boundary reachability score describes a minimal speed/ease/duration of traveling from a node location of a respective response node to a point in a respective immersive AR supervision boundary. For example, if the maximum estimated arrival duration from a node location (e.g., a provider location) of a respective response node to a location in a respective immersive AR supervision boundary is 5:03 minutes, then the supervision boundary reachability score for the respective response node with respect to the respective immersive AR supervision boundary is determined based at least in part on the estimated arrival duration. As another example, if a respective immersive AR supervision boundary includes L locations associated with L estimated arrival durations, where each estimated arrival duration is the estimated arrival duration from a node location of a response node to a location of the L locations, then the geographic reachability score is determined based at least in part on the largest estimated arrival duration of the L estimated arrival durations. In some embodiments, if a respective immersive AR supervision boundary includes L locations associated with L supervision boundary reachability scores, where each supervision boundary reachability score describes a speed/ease/duration of traveling from a node location of a response node to a location of the L locations, then the geographic reachability score is determined based at least in part on the smallest supervision boundary reachability score of the L supervision boundary reachability scores. In some embodiments, if the supervision boundary reachability score for a proximate response node with respect to an immersive AR supervision boundary satisfies a supervision boundary reachability score threshold, the proximate response node is in a covered subset for the immersive AR supervision boundary.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (ARAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing AR processing and generating corresponding AR user interface data (e.g., for providing and/or updating a user interface). The system architecture 100 includes an AR processing system 101 comprising an AR processing computing entity 106 configured to generate AR outputs that can be used to generate AR interfaces. The AR processing system 101 may communicate with one or more client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the AR processing system 101. The AR processing computing entity 106 may be in communication with one or more client computing entities 102, such as one or more agent computing entities 111 associated with monitoring agents (e.g., custodians) of a user of the AR device 103, one or more responsive computing entities 112 associated with one or more response nodes (e.g., caregivers), and/or the like. The AR processing computing entity 106 may be configured to receive requests and/or data from client computing entities 102, process the requests and/or data to generate AR outputs (e.g., AR processing data objects), and provide the AR outputs to the client computing entities 102. The client computing entity 102 (e.g., management computing entity) may periodically update/provide raw input data (e.g., data objects describing primary events and/or secondary events) to the AR processing system 101. The client computing entities 102 may further generate user interface data (e.g., one or more data objects) corresponding to the AR outputs and may provide (e.g., transmit, send and/or the like) the user interface data corresponding with the AR outputs for presentation to user computing entities operated by end users.

The storage subsystem 108 may be configured to store at least a portion of the data utilized by the AR processing computing entity 106 to perform AR processing steps/operations and tasks. The storage subsystem 108 may be configured to store at least a portion of operational data and/or operational configuration data including operational instructions and parameters utilized by the AR processing computing entity 106 to perform AR processing steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, ARAM, RRAM, SONOS, FJG RAM, Millipede memory, racetrack memory, and/or the like.

Exemplary AR Processing Computing Entity

FIG. 2 provides a schematic of an AR processing computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the AR processing computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the AR processing computing entity 106 may include or be in communication with a processing element 205 (also referred to as processors, processing circuitry, and/or similar terms used herein interchangeably) that communicate with other elements within the AR processing computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the AR processing computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, ARAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the AR processing computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the AR processing computing entity 106 with the assistance of the processing element 205 and operating system.

As indicated, in one embodiment, the AR processing computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the AR processing computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the AR processing computing entity 106 may include or be in communication with one or more input elements, such as a keyboard input, a mouse input, a touch screen/display input, motion input, movement input, audio input, pointing device input, joystick input, keypad input, and/or the like. The AR processing computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the AR processing computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the AR processing computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the AR processing computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, ARAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the AR processing computing entity 106 and/or various other computing entities.

In another embodiment, the client computing entity 102 may include one or more components or functionality that are the same or similar to those of the AR processing computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical advantages associated with resource usage efficiency of generating an immersive AR supervision boundary for an AR software application. Various existing AR solutions generate immersive AR supervision boundaries using a large image/video data captured from an environment of the AR user. Transmitting such image/video data is typically burdensome for computer networks that connect AR devices to AR processing server systems, storing such image/video data is typically burdensome for storage resources of AR devices and AR processing server, and/or processing such image/video is typically burdensome for computational resources of AR processing servers. To address the noted challenges, various embodiments of the present invention introduce machine learning techniques that enable using predictive signals obtained from location-based data and predictive signals obtained from sensory/monitoring data other than image/video data to generate and dynamically maintain immersive AR supervision boundaries. In this way, various embodiments reduce or eliminate the need for transmitting, storing, and/or processing large image/video data to generate immersive AR supervision boundaries in AR software applications, thus improving resource usage efficiency of generating an immersive AR supervision boundary for an AR software application.

FIG. 4 is a flowchart diagram of an example process 400 for dynamically adjusting/updating an immersive AR supervision boundary for an AR device 103. Via the various steps/operations of the process 400, the AR processing computing entity 106 can use real-time location data associated with an AR device 103, real-time monitoring data associated with a monitored user of the AR device 103, and historical data associated with the monitored user of the AR device 103 to initially generate and dynamically update an immersive AR supervision boundary for the AR device 103 that is then used to perform various AR interaction actions/operations in relation to the AR device 103 and/or in relation to one or more client computing entities 102.

The process 400 begins at step/operation 401 when the AR processing computing entity 106 identifies an initial immersive AR supervision boundary for the AR device 103. In some embodiments, the AR processing computing entity 106 generates the initial immersive AR supervision boundary based at least in part on historical data (e.g., based at least in part on electronic medical record data) associated with a user of the AR device 103. In some embodiments, the AR processing computing entity 106 generates the initial immersive AR supervision boundary based at least in part on a geographic region centered around a current AR device location of the AR device that has a defined geometric shape (e.g., is a circle, is a square, and/or the like) and is associated with one or more defined radius values (e.g., one defined radius value for a circle and a square, two defined radius values for a rectangle, and/or the like). In some embodiments, the geometric shapes and/or the radius values of the initial immersive AR supervision boundary are determined based at least in part on configuration hyper-parameters of the AR processing system 101 and/or based at least in part on historical data (e.g., based at least in part on electronic medical record data) associated with a user of the AR device 103.

In some embodiments, an immersive AR supervision boundary describes a geographic region surrounding a current AR device location of an AR device. In some embodiments, the immersive AR supervision boundary is dynamically updated over time and across a set of defined update timesteps (e.g., a set of periodic update timesteps). In some embodiments, the latest immersive AR supervision boundary at each update timestep is used to perform one or more AR interaction actions relation to the AR device 103 and/or in relation to one or more client computing entities 102. For example, in some embodiments, the latest immersive AR supervision boundary at each time is used to provide navigational instructions to a user of the AR device 103 and via the AR device 103. As another example, in some embodiments, the latest immersive AR supervision boundary at each update timestep is used to display geographic marker data describing boundaries of the geographic region associated with the latest immersive AR supervision boundary to a user of the AR device 103 and via the AR device 103. As yet another example, in some embodiments, the latest immersive AR supervision boundary at each update timestep is used to provide supervision boundary modification notification data to one or more agent computing entities 111 associated with monitoring agents (e.g., custodians) of a user of the AR device 103 each time the latest immersive AR supervision boundary is different from a prior immersive AR supervision boundary. As a further example, in some embodiments, the latest immersive AR supervision boundary at each update timestep is used to provide supervision boundary notification data to one or more responsive computing entities associated with one or more proximate response nodes that are covered by the latest updated immersive AR supervision boundary. As a further example, in some embodiments, the immersive AR supervision boundary is updated based at least in part on an indication from a supervisor user that a monitored user has gone beyond an acceptable boundary/zone/area. In some of the noted embodiments, the indication may cause an AR device associated with the monitored user to generate visual outputs (e.g., push notifications), voice outputs (e.g., voice instructions provided by the supervisor user profile), and/or haptic (e.g., vibratory) outputs.

At step/operation 402, the AR processing computing entity 106 generates an exposure classification for the AR device 103 based at least in part on a real-time monitoring data object associated with the AR device and a historical state data object associated with the AR device. As depicted in FIG. 4, step/operation 402 may be performed at the beginning of each iteration of an iterative supervision boundary update routine 411, where each iteration of the iterative supervision boundary update routine 411 may be performed during an update timestep (e.g., a periodically triggered update timestep that is triggered in accordance with a defined periodicity schedule) in order to update a current immersive AR supervision boundary for the AR device 103 based at least in part on the latest real-time monitoring data object associated with the AR device 103, the latest current AR device location for the AR device, latest response node availability data associated with a set of response nodes, and/or the like.

In some embodiments, the real-time monitoring data object may describe most-recently-received monitoring data associated with a set of sensors that are configured to monitor conditions (e.g., physiological conditions, mental conditions, environmental conditions, and/or the like) of a user of an AR device. In some embodiments, the set of sensors include at least one of sensors included as part of the AR device or sensors included as part of other computing devices that are attached to and/or carried by the user of the AR device. Examples of such sensor devices include pulse rate monitoring devices, heart rate monitoring devices, body temperature monitoring devices, blood pressure monitoring devices, electroencephalography (EEG) monitoring devices, skin conductance monitoring devices, blood oxygen level (SpO2) monitoring devices, ambient temperature monitoring devices, wind intensity monitoring devices, humidity monitoring devices, visibility monitoring devices, and/or the like. In some embodiments, the real-time monitoring data object describes latest physiological monitoring data of a user of an AR device and latest environmental (e.g., weather) data of an environment of the user.

In some embodiments, the real-time monitoring data object comprises N categorical real-time monitoring embedding vectors, where each categorical real-time monitoring embedding vector is a vector describing latest monitoring data associated with a corresponding real-time monitoring category. A real-time monitoring category may describe a category of sensory data that is monitored in real-time and/or in near-real-time. Examples of real-time monitoring categories include a pulse rate monitoring category, a heart rate monitoring category, a body temperature monitoring category, a blood pressure monitoring category, an electroencephalography (EEG) monitoring category, a skin conductance monitoring category, a blood oxygen level (SpO2) monitoring category, an ambient temperature monitoring category, a wind intensity monitoring category, a humidity monitoring category, a visibility monitoring category, and/or the like. For example, in some embodiments, a real-time monitoring data object comprises at least one of a pulse rate monitoring vector, a heart rate monitoring vector, a body temperature monitoring vector, a blood pressure monitoring vector, an electroencephalography (EEG) monitoring vector, a skin conductance monitoring vector, a blood oxygen level (SpO2) monitoring vector, an ambient temperature monitoring vector, a wind intensity monitoring vector, a humidity monitoring vector, a visibility monitoring vector, and/or the like.

In some embodiments, the historical state data object describes historical condition data associated with a user of an AR device. For example, a historical state data object may describe one or more data entries inferred from an electronic medical record (EMR) of the user, such as data entries describing baseline physiological measurements for the user, data entries describing one or more preexisting conditions/ailments of the user, and/or the like. In some embodiments, the historical state data object describes at least one of a pulse rate baseline of the user, a heart rate baseline of the user, a body temperature baseline of the user, a blood pressure baseline of the user, an electroencephalography (EEG) baseline of the user, a skin conductance baseline of the user, a blood oxygen level (SpO2) baseline of the user, an ambient temperature baseline of the user environment, a wind intensity baseline of the user environment, a humidity baseline of the user environment, a visibility baseline of the user environment, and/or the like. In some embodiments, the historical state data object for a user of the AR device is converted to a fixed-dimensional vector representation called a static embedding that can then be used along with a set of categorical real-time monitoring embedding vectors for the AR device to generate a real-time monitoring embedding for the AR device.

In some embodiments, the exposure classification for an AR device may describe an inferred/predicted determination about whether the user of the AR device is in need of interventions by one or more intervention providers (e.g., one or more medical providers) associated with one or more response nodes. For example, in some embodiments, the real-time monitoring data object of an AR device and a historical state data object of the user of the AR device may describe that the conditions of the user are in such a state as to require provider assistance. In some embodiments, when an AR processing computing entity determines that the user of the AR device is in need of interventions by one or more intervention providers, the exposure classification for the AR device is an affirmative exposure classification. In some embodiments, when an AR processing computing entity determines that the user of the AR device is not in need of interventions by one or more intervention providers, the exposure classification for the AR device is a negative exposure classification. In some embodiments, the exposure classification of an AR device is determined by processing the real-time monitoring data object associated with the AR device and the historical state data object associated with the AR device using an exposure classification machine learning framework, as further described below. In some embodiments, in addition to describing that the user of the AR device is in need of interventions by one or more intervention providers, the exposure classification for the AR device may further describe the reason for the noted intervention need (e.g., heart failure, disturbed mental state, and/or the like).

In some embodiments, an exposure classification machine learning framework is configured to generate an exposure classification for an AR device based at least in part on the real-time monitoring data object associated with the AR device and the historical state data object associated with the AR device. In some embodiments, the exposure classification machine learning framework comprises a real-time embedding machine learning model, an exposure clustering machine learning model, and a cluster mapping machine learning model, where: (i) the real-time embedding machine learning model is configured to generate a real-time monitoring embedding for the AR device based at least in part on the real-time monitoring data object and the historical state data object, (ii) the exposure clustering machine learning model is configured to generate a selected exposure cluster for the monitored individual based at least in part on the real-time monitoring embedding for the AR device, and (iii) the exposure clustering machine learning model is configured to generate a selected exposure cluster for the monitored individual based at least in part on the real-time monitoring embedding for the AR device. In some embodiments, inputs to the exposure classification machine learning framework comprise at least one of the following: (i) a set of categorical real-time monitoring embedding vectors for an input AR device as determined based at least in part on the real-time monitoring data object for the input AR device, and (ii) a fixed-dimensional vector representation called a static embedding that is determined based at least in part on the historical state data object for the input AR device. In some embodiments, outputs of the exposure classification machine learning framework comprise a vector describing a selected exposure classification for an input AR device, for example a vector describing a classification score for each candidate exposure classification of a set of candidate exposure classifications for the input AR device (where the exposure classification for the input AR device may be determined based at least in part on the candidate exposure classification having a maximal classification score). In some embodiments, outputs of the exposure classification machine learning framework comprise an atomic value and/or a vector describing an identifier of the selected exposure classification for an input AR device.

An operational example of an exposure classification machine learning framework 500 is depicted in FIG. 5. As depicted in FIG. 5, the exposure classification machine learning framework 500 comprises a real-time embedding machine learning model 501, an exposure clustering machine learning model 502, and a cluster mapping machine learning model 503.

As further depicted in FIG. 5, the real-time embedding machine learning model 501 may be configured to generate a real-time monitoring embedding 521 for the AR device based at least in part on the real-time monitoring data object 511 associated with the AR device and the historical state data object 512 associated with the AR device. In some embodiments, the real-time embedding machine learning model 501 is a supervised machine learning model that is trained based at least in part on historical intervention outcome data associated with a set of historical monitoring sessions (e.g., historical intervention outcome data describing whether historical monitoring sessions were subsequently determined to be in need of intervention). In some embodiments, the real-time monitoring data object is used to generate N categorical real-time monitoring vector for N real-time monitoring categories. In some of the noted embodiments, the real-time embedding machine learning model 501 is configured to: (i) generate, for each real-time monitoring category, a categorical real-time monitoring embedding vector based at least in part on the categorical real-time monitoring vector for the real-time monitoring category, and (ii) combine the N categorical real-time monitoring embedding vectors for the N real-time monitoring categories and a static embedding for the AR device to generate the real-time monitoring embedding for the AR device.

In some embodiments, the real-time embedding machine learning model comprises N sequential processing sub-models each associated with a real-time monitoring category of N monitoring categories. Each sequential processing sub-model may be configured to process the categorical real-time monitoring vector for a corresponding real-time monitoring category and a sequential model hidden state vector for the sequential processing sub-model to generate a categorical real-time monitoring embedding vector for the corresponding real-time monitoring category. For example, a sequential processing sub-model that is associated with a heart rate monitoring category may process a fixed-dimensional vector describing latest heart rate data associated with a user of an AR device along with a hidden state vector for the sequential processing sub-model to generate a categorical real-time monitoring embedding vector for the heart rate monitoring category. As another example, a sequential processing sub-model that is associated with an EEG monitoring category may process a fixed-dimensional vector describing latest heart rate data associated with a user of an AR device along with a hidden state vector for the sequential processing sub-model to generate a categorical real-time monitoring embedding vector for the EEG monitoring category.

In some embodiments, each sequential processing sub-model comprises a recurrent neural network component (e.g., a conventional recurrent neural network component, a long short term memory network component, a gated recurrent unit network component, and/or the like) that is configured to, during each recurrent neural network timestep, generate input data that is generated based at least in part on the categorical real-time monitoring vector for a corresponding real-time monitoring category and a hidden state vector to generate output data comprising an updated hidden state vector. In some embodiments, during an initial recurrent neural network timestep, the hidden state vector for the recurrent neural network component may be a predefined initialized hidden state vector (e.g., a predefined initialized hidden state vector having all zero values). In some embodiments, during each post-initial recurrent neural network timestep, the hidden state vector for the recurrent neural network component may be the updated hidden state vector generated by the recurrent neural network component during a preceding recurrent neural network timestep of the post-initial recurrent neural network timestep. In some embodiments, the input to the recurrent neural network component during each recurrent neural network timestep is generated by: (i) performing one or more domain conversion operations (e.g., one or more Fast Fourier Transform operations) on the categorical real-time monitoring vector for the recurrent neural network timestep to generate a domain-converted embedding, (ii) performing one or more convolutional neural network operations (e.g., one or more one-dimensional convolutional neural network operations) on the domain-converted embedding to generate a convolutional embedding, and (iii) generating the input based at least in part on the convolutional embedding.

An operational example of a real-time embedding machine learning model 501 that is associated with N=3 is depicted in FIG. 6. As depicted in FIG. 6, inputs to the real-time embedding machine learning model 501 comprise: (i) the static embedding 601, (ii) a first categorical real-time monitoring vector 602 for the pulse rate monitoring category, (iii) a second categorical real-time monitoring vector 603 for the blood pressure monitoring category, and (iv) a third categorical real-time monitoring vector 604 for the EEG monitoring category.

As further depicted in FIG. 6, each categorical real-time monitoring vector is processed through a sequential processing sub-model to generate a categorical real-time monitoring embedding vector. For example, the first categorical real-time monitoring vector 602 is processed using a sequential processing sub-model that is associated with the pulse rate monitoring category to generate a first categorical real-time monitoring embedding vector 611. As another example, the second categorical real-time monitoring vector 603 is processed using a sequential processing sub-model that is associated with the blood pressure monitoring category to generate a second categorical real-time monitoring embedding vector 612. As yet another example, the third categorical real-time monitoring vector 604 is processed using a sequential processing sub-model that is associated with the EEG monitoring category to generate a third categorical real-time monitoring embedding vector 613.

As further depicted in FIG. 6, each sequential processing sub-model includes a Fast Fourier Transform (FFT) component, followed by a one-dimensional convolutional neural network (Conv-1D) component, and followed by a Long Short Term Memory (LSTM) component. In some embodiments, each sequential processing sub-model is configured to: (i) generate, using one or more domain conversion operations and based at least in part on the categorical real-time monitoring vector for a particular real-time monitoring category, a domain-converted embedding for the particular real-time monitoring category, (ii) generate, using one or more one-dimensional convolutional neural network operations and based at least in part on the domain-converted embedding for the particular real-time monitoring category, a convolutional embedding for the particular real-time monitoring category, and (iii) generate, using one or more recurrent neural network operations and based at least in part on the convolutional embedding for the particular real-time monitoring category, the categorical real-time monitoring embedding vector for the particular real-time monitoring category.

As further depicted in FIG. 6, the real-time embedding machine learning model 501 comprises a merger sub-model 621 that is configured to merge (e.g., combine, concatenate, add, and/or the like) the static embedding 601, the first categorical real-time monitoring embedding vector 611, the second categorical real-time monitoring embedding vector 612, and the third categorical real-time monitoring embedding vector 613 to generate a merged vector 631 that is then processed by one or more dense machine learning layers 641 (e.g., one or more feedforward machine learning layers, one or more fully connected machine learning layers, and/or the like) to generate the real-time monitoring embedding 521 that may describe a physical/physiological/emotional/mental state of a user of an AR device. In some embodiments, the real-time monitoring embedding layer is the merged vector 631, while the dense machine learning layers 641 are configured to generate an exposure score (e.g., a physical/physiological/emotional/mental state score).

Returning to FIG. 5, the exposure clustering machine learning model 502 is configured to generate a selected exposure cluster 531 for the AR device based at least in part on the real-time monitoring embedding for the AR device and a cluster affinity score 532 for the real-time monitoring embedding 521 of the AR device relative to the selected exposure cluster 531. In some embodiments, the exposure clustering machine learning model 502 is configured to: (i) receive a set of historical real-time monitoring embeddings each associated with a ground-truth label (e.g., a ground-truth label describing whether the user of the AR device was confirmed to be in need of intervention at a time associated with the corresponding historical real-time monitoring embedding), (ii) process the set of historical real-time monitoring embeddings and the corresponding set of ground-truth labels using a clustering machine learning routine (e.g., a k-means clustering routine) to generate a set of (e.g., a predefined number of, a dynamically determined number of, and/or the like) exposure clusters each comprising a subset of the historical real-time monitoring embeddings, (iii) determine the selected exposure cluster 531 for the AR device from the set of exposure clusters, (iv) determine the cluster affinity score 532 for the real-time monitoring embedding 521 of the AR device relative to the selected exposure cluster 531 based at least in part on a measure (e.g., a Silhouette measure) that describes an inferred/predicted degree of relatedness between the real-time monitoring embedding 521 and the selected exposure cluster 531. In some embodiments, inputs to the exposure clustering machine learning model include a vector describing the real-time monitoring embedding for an input AR device, while outputs of the exposure clustering machine learning model include a vector and/or an atomic value describing the selected exposure cluster for the AR device. In some embodiments, the exposure clustering machine learning model is trained based at least in part on a set of historical real-time monitoring embeddings each associated with a ground-truth label, as further described below.

In some embodiments, the exposure clustering machine learning model 502 is configured to perform the steps/operations of the process that is depicted in FIG. 7. The process that is depicted in FIG. 7 begins at step/operation 701 when the AR processing computing entity 106 a set of historical real-time monitoring embeddings each associated with a ground-truth label. In some embodiments, a historical real-time monitoring embedding describes a real-time monitoring embedding that is generated by the real-time embedding machine learning model via processing a historical real-time monitoring data object (e.g., a historical real-time monitoring data object received during a previous update timestep for the current user of the AR device, a historical real-time monitoring data object received during a previous AR processing session for the current user, a historical real-time monitoring data object received in the past for a different user such as a user that has the same demographic profile and/or preexisting condition profile as the current user). In some embodiments, the ground-truth label of a historical real-time monitoring embedding describes whether the user of the AR device was confirmed (e.g., based at least in part on subsequent medical evaluation result data) to be in need of intervention at a time associated with a corresponding historical real-time monitoring embedding.

At step/operation 702, the AR processing computing entity 106 generates a set of exposure clusters based at least in part on the set of historical real-time monitoring embeddings and the corresponding set of ground-truth labels. In some embodiments, the AR processing computing entity 106 processes the set of historical real-time monitoring embeddings and the corresponding set of ground-truth labels using a clustering machine learning routine (e.g., a k-means clustering routine) to generate a set of (e.g., a predefined number of) exposure clusters each comprising a subset of the historical real-time monitoring embeddings. In some embodiments, each exposure cluster is associated with a ground-truth label that describes at least one of the following: (i) whether strong association of a real-time monitoring data object for an update timestep with the exposure cluster describes that the user of the AR device is in need of intervention during a time associated with the update timestep, (ii) whether strong association of a real-time monitoring data object for an update timestep with the exposure cluster describes that the user of the AR device is in need of intervention for a particular reason (e.g., for heart failure, for disturbed mental state, and/or the like) during a time associated with the update timestep, or (iii) whether strong association of a real-time monitoring data object for an update timestep with the exposure cluster describes that the user of the AR device is in need of intervention of a particular kind (e.g., family member attention, social worker attention, mouth-to-mouth recitation, insulin injection, and/or the like) during a time associated with the update timestep.

At step/operation 703, the AR processing computing entity 106 determines the selected exposure cluster 531 for the AR device by selecting an optimal exposure cluster for the real-time monitoring embedding 521 from the set of exposure clusters. In some embodiments, the AR processing computing entity 106 maps the real-time monitoring embedding 521 to an d-dimensional clustering space associated with the clustering machine learning routine (where d is the dimension of real-time monitoring embeddings). In some embodiments, for each exposure cluster, the AR processing computing entity 106 determines a distance measure based at least in part on a mapping of the cluster in the clustering space (e.g., a mapping of the cluster centroid in the clustering space) and the mapping of the real-time monitoring embedding 521 in the clustering space. In some embodiments, the AR processing computing entity 106 determines that the exposure cluster having the smallest distance measure is the selected exposure cluster.

At step/operation 704, the AR processing computing entity 106 generates the cluster affinity score 532 (e.g., a Silhouette score) for the AR device. In some embodiments, the AR processing computing entity 106 generates the cluster affinity score 532 for the AR device based at least in part on an inferred/predicted degree of relatedness between the real-time monitoring embedding 521 of the AR device and the selected exposure cluster 531, such as an inferred/predicted degree of relatedness that is determined using the Silhouette technique.

Returning to FIG. 5, the cluster mapping machine learning model 503 is configured to map the selected exposure cluster 531 for the AR device to the exposure classification 541 for the AR device based at least in part on the cluster affinity score 532. In some embodiments, the inputs to the cluster mapping machine learning model include one or more input vectors describing a selected exposure cluster and a cluster affinity score. In some embodiments, outputs of the cluster mapping machine learning model comprise a vector describing a selected exposure classification for an input AR device, for example a vector describing a classification score for each candidate exposure classification of a set of candidate exposure classifications for the input AR device (where the exposure classification for the input AR device may be determined based at least in part on the candidate exposure classification having a maximal classification score). In some embodiments, outputs of the cluster mapping machine learning model comprise an atomic value describing an identifier of the selected exposure classification for an input AR device.

In some embodiments, if the cluster affinity score 532 satisfies (e.g., exceeds) a cluster affinity score threshold, the cluster mapping machine learning model 503 determines that the AR device is associated with an exposure classification that is associated with the ground-truth label for the selected exposure cluster 531. For example, if the cluster affinity score 532 satisfies (e.g., exceeds) a cluster affinity score threshold, and further if the ground-truth label for the selected exposure cluster 531 describes that strong association of a real-time monitoring data object for an update timestep with the selected exposure cluster 531 describes that the user of the AR device is in need of intervention during a time associated with the update timestep, then the cluster mapping machine learning model may select an affirmative exposure classification for the AR device. As another example, if the cluster affinity score 532 satisfies (e.g., exceeds) a cluster affinity score threshold, and further if the ground-truth label for the selected exposure cluster 531 describes that strong association of a real-time monitoring data object for an update timestep with the selected exposure cluster 531 describes that the user of the AR device is not in need of intervention during a time associated with the update timestep, then the cluster mapping machine learning model may select a negative exposure classification for the AR device.

In some embodiments, if the cluster affinity score 532 fails to satisfy (e.g., fails to exceed) a cluster affinity score threshold, the cluster mapping machine learning model 503 applies one or more boundary classification rules to generate the exposure classification. For example, in some embodiments, if cluster affinity score 532 fails to satisfy (e.g., fails to exceed) a cluster affinity score threshold, the cluster mapping machine learning model 503 may determine an affirmative exposure classification if the reachability score for at least one response node relative to the current AR device location satisfies a reachability score threshold (e.g., where the reachability score may be determined based at least in part on an estimated arrival duration of a response provider from a response node location of the response node to the current AR device of the AR device). As another example, in some embodiments, if cluster affinity score 532 fails to satisfy (e.g., fails to exceed) a cluster affinity score threshold, the cluster mapping machine learning model 503 may determine a negative exposure classification if the reachability score for at least one response node relative to the current AR device location fails to satisfy a reachability score threshold. As yet another example, in some embodiments, if cluster affinity score 532 fails to satisfy (e.g., fails to exceed) a cluster affinity score threshold, the cluster mapping machine learning model 503 may determine an affirmative exposure classification if the estimated arrival duration for at least one response node relative to the current AR device location fails to satisfy an estimated arrival duration threshold. As yet another example, in some embodiments, if cluster affinity score 532 fails to satisfy (e.g., fails to exceed) a cluster affinity score threshold, the cluster mapping machine learning model 503 may determine a negative exposure classification if the estimated arrival duration for at least one response node relative to the current AR device location satisfies an estimated arrival duration threshold.

Returning to FIG. 4, at step/operation 403, the AR processing computing entity 106 generate (e.g., in response to determining that the exposure classification is an affirmative exposure classification), for each proximate response node associated with the AR device, a responsiveness score (e.g., based at least in part on the exposure classification). In some embodiments, the AR processing computing entity 106 identifies one or more proximate response nodes for the AR device, determines one or more responsiveness parameters for each proximate response node, and determines the responsiveness score for each proximate responsive node based at least in part on the responsiveness parameters for the proximate response node.

In some embodiments, step/operation 403 may be performed in accordance with the process that is depicted in FIG. 8, which is an example process for generating a responsiveness score for a proximate response node. The process that is depicted in FIG. 8 begins at step/operation 801 when the AR processing computing entity 106 identifies the proximate response node. In some embodiments, to identify a set of proximate response nodes for the AR device, the AR processing computing entity 106: (i) identifies a set of candidate response nodes, and (ii) performs a set of filtering operations on the set of candidate response nodes to generate the set of proximate response nodes. In some embodiments, the set of filtering operations include: (i) a filtering operation that is configured to select candidate response nodes whose response node locations are within a predetermined distance from the current AR device location of the AR device, (ii) a filtering operation that is configured to select candidate response nodes whose experience/expertise criteria match a monitoring category (e.g., a preexisting condition category, a physical/physiological/mental/psychological condition category, such as a physical/physiological/mental/psychological condition category that is determined based at least in part on the exposure classification, and/or the like) of the user of the AR device, and (iii) a filtering operation that is configured to select candidate response nodes whose reachability score satisfies a reachability score threshold (e.g., whose estimated arrival duration is below an estimated arrival duration threshold).

For example, in some embodiments, to determine a set of proximate response nodes, the AR processing computing entity 106: (i) identifies a set of candidate response nodes, (ii) filters the set of candidate response nodes to exclude those candidate response nodes whose respective locations are outside a threshold radius of the current AR device location and thus generate a first subset of candidate response nodes, (iii) filters the first subset to exclude those candidate response nodes whose experience/expertise criteria do not match a monitoring category (e.g., a preexisting condition category, a physical/physiological/mental/psychological condition category, and/or the like) of the user of the AR device and thus generate a second subset of candidate response nodes, and (iii) filters the second subset to exclude those candidate response nodes whose estimated arrival duration equals or is above an estimated arrival duration threshold and thus generate the set of proximate response nodes. In some embodiments, the set of consecutive filtering operations performed on a set of candidate response nodes to generate the set of proximate response nodes include performing one or more multi-hop graph queries on a graph data object that describes relationships between at least two of AR devices users (e.g., patients), providers associated with response nodes, and physical/physiological/mental/psychological condition categories, such as the graph data object 900 of FIG. 9.

In some embodiments, a response node describes feature data (e.g., responsiveness parameter data, location data, availability data, expertise data, experience data, and/or the like) associated with a service provider (e.g., a caregiver). In some embodiments, the location (e.g., the office location, the location determined in real-time and/or near-real-time using for example Geographic Positioning System (GPS) capabilities, and/or the like) of a service provider is referred to as the node location or the response node location for the corresponding response node. In some embodiments, when a response node survives one or more filtering criteria for an AR device, the response node is classified as a proximate response node for the noted AR device.

At step/operation 802, the AR processing computing entity 106 determines one or more responsiveness parameters for the proximate response node. In some embodiments, a responsiveness parameter describes a feature related to response speed and/or response effectiveness of a provider (e.g., a caregiver) associated with a corresponding response node (e.g., a corresponding proximate response node for an AR device). In some embodiments, the responsiveness parameters for a response node include a real-time reachability score (e.g., an estimated arrival duration) that describes a speed/ease/duration of traveling from a node location (e.g., a provider office location, a caregiver office location, a hospital location, and/or the like) for the response node and the current AR device location for the AR device, where the real-time reachability score may be determined based at least in part on mobility data (e.g., traffic data, road closure data, and/or the like) associated with various paths between the node location and the current AR device location. In some embodiments, the responsiveness parameters for a response node include a historical experience quality parameter that describes a statistical distribution measure for previous rankings of experience quality (e.g., previous patient experience rankings) for the provider that is associated with the response node by the user of the AR device and/or by users having a similar demographic profile as the user of the response node. In some embodiments, the responsiveness parameters for a response node include a historical responsiveness parameter that describes a statistical distribution measure of responsiveness quality by the provider associated with the response node (e.g., a caregiver responsiveness index). In some embodiments, the responsiveness parameters for a response node include a circumstantial capability parameter that describes a Boolean value indicating whether the provider associated with the response node is available for response at a time associated with a current update timestep.

An operational example of a table 1000 that describes the responsiveness parameters for a set of three response nodes is depicted in FIG. 10. As depicted in FIG. 10, each responsiveness parameter whose label is described in the first column of the table 1000 is associated with: (i) a circumstantial capability parameter that is described by a corresponding value in the second column of the table 1000, (ii) a real-time reachability score that is described by a corresponding value in the third column of the table 1000, (iii) a historical experience quality parameter that is described by a corresponding value in the fourth column of the table 1000, and (iv) a historical responsiveness parameter that is described by a corresponding value in the fifth column of the table 1000. As further depicted in FIG. 10, each responsiveness parameter whose label is described in the first column of the table 1000 is associated with a computed responsiveness score described by a corresponding value in the sixth column of the table 1000.

Returning to FIG. 8, at step/operation 803, the AR processing computing entity 106 processes the one or more responsiveness parameters for the proximate response node to generate a responsiveness score for the proximate response node. The responsiveness score for a response node may describe an estimated/predicted likelihood that the provider associated with the response node will provide effective and timely response in the event of the occurrence of a response need scenario (e.g., a heart failure by the user of the AR device). In some embodiments, the responsiveness score for a response node is generated by processing the responsiveness parameters associated with the response using a responsiveness scoring machine learning model, as further described below.

In some embodiments, the responsiveness scoring machine learning model is configured to process responsiveness score for a response node to generate a responsiveness score for the response node. In some embodiments, the responsiveness score for a response node is configured to process, at least in part, M or M−1 responsiveness parameters (e.g., all responsiveness parameters, all responsiveness parameters other than an index responsiveness parameter such as the circumstantial capability parameter, and/or the like) for a response node and M or M−1 corresponding responsiveness parameter weights for the M or M−1 responsiveness parameters to generate the responsiveness score for the response node. In some embodiments, at least a subset of the M or M−1 corresponding responsiveness parameter weights are determined based at least in part on trained parameters of the responsiveness scoring machine learning model. In some embodiments, at least a subset of the M or M−1 corresponding responsiveness parameter weights are determined based at least in part on predefined hyperparameters of the responsiveness scoring machine learning model. In some embodiments, the responsiveness scoring machine learning model comprises one or more neural network layers, such as one or more neural network fully-connected layers and/or one or more feedforward neural network layers. In some embodiments, the responsiveness scoring machine learning model comprises one or more regression layers, such as one or more linear regression layers and/or one or more one or more polynomial regression layers.

In some embodiments, the responsiveness scoring machine learning model is configured to perform operations of the equation $$RS = \frac{\sum_{i=1}^{M} p_i w_i}{\sum_{j=1}^{M} w_j},$$

where RS is the responsiveness score for a response node, each $p_a$ value is an ath responsiveness parameter for the response node, each $w_b$ is a bth responsiveness parameter for the response node, and both i and j are index parameters that iterate over M responsiveness parameters. In some embodiments, the responsiveness scoring machine learning model is configured to perform operations of the equation $$RS = C * \frac{\sum_{i=1}^{M-1} p_i w_i}{\sum_{j=1}^{M-1} w_j},$$

where RS is the responsiveness score for a response node, each $p_a$ value is an ath non-circumstantial-capability responsiveness parameter for the response node, each $w_b$ is a bth responsiveness parameter for the non-circumstantial-capability response node, both i and j are index parameters that iterate over M−1 non-circumstantial-capability responsiveness parameters, and C is the circumstantial capability parameter for the response node. In some of the noted embodiments, the responsiveness scoring machine learning model is configured to perform operations of the equation $$RS = C * \frac{p_1 w_1 + p_2 w_2 + p_3 w_3 + p_4 w_4}{w_1 + w_2 + w_3 + w_4},$$

where RS is the responsiveness score for a response node, $p_1$ is the real-time reachability score, $w_1$ is the responsiveness parameter weight for the real-time reachability score, $p_2$ is the historical experience quality parameter, $w_2$ is the responsiveness parameter weight for the historical experience quality parameter, $p_3$ is the historical responsiveness parameter, $w_3$ is the responsiveness parameter weight for the historical responsiveness parameter, $p_4$ is a third-party ranking parameter (e.g., that describes a measure of statistical distribution of response quality rankings for the provider associated with the response node by one or more third parties other than the user of the AR device), $w_4$ is the responsiveness parameter weight for the third-party ranking parameter, and C is the circumstantial capability parameter.

In some embodiments, inputs to the responsiveness scoring machine learning model include a vector describing one or more responsiveness parameters of an input response node. In some embodiments, outputs of the responsiveness scoring machine learning model include a vector and/or an atomic value describing the responsiveness score generated by the responsiveness scoring machine learning model for the input response node. In some embodiments, the responsiveness scoring machine learning model is trained based at least in part on historical data describing ground-truth responsiveness evaluation results of a set of providers, such as ground-truth responsiveness evaluation results determined using subject-matter-expertise audit evaluations and/or based at least in part on regulatory audit evaluations.

Returning to FIG. 4, in some embodiments, step/operation 403 includes ranking the one or more response nodes based at least in part on responsiveness scores (e.g., in a descending order of responsiveness scores), where at least providers associated with a subset of the ranked list (e.g., the top J response nodes) may be contacted to notify them of a potential response node scenario. In some embodiments, the ranked list of response nodes may be used to generate a ranked provider list (e.g., a ranked caregiver list) that may be presented to one or more agent computing entities 111 associated with monitoring agents of a user of the AR device 103 as part of performing AR interaction actions.

At step/operation 404, the AR processing computing entity 106 generates an updated immersive AR supervision boundary based at least in part on the proximate response nodes for the AR device. In some embodiments, the AR processing computing entity 106 generates a supervision boundary reliability score for the current immersive AR supervision boundary. In some of the noted embodiments, if the supervision boundary reliability score satisfies (e.g., exceeds) a supervision boundary reliability score threshold, the AR processing computing entity 106 maintains the current immersive AR supervision boundary as the updated immersive AR supervision boundary. In some embodiments, if the supervision boundary reliability score fails to satisfy (e.g., fails to satisfy) a supervision boundary reliability score threshold, the AR processing computing entity 106 modifies the current immersive AR supervision boundary in accordance with the techniques described below to generate the updated immersive AR supervision boundary.

An operational example of updating the immersive AR supervision boundary is depicted in FIGS. 11A-11B. As depicted in FIGS. 11A-11B, the AR processing computing entity 106 updates the current immersive AR supervision boundary 1101 at a current update timestep to generate the updated immersive AR supervision boundary 1102 by shrinking (i.e., reducing a supervision boundary area) of the current immersive AR supervision boundary 1101 so that the supervision boundary reliability score for the updated immersive AR supervision boundary 1102 satisfies the supervision boundary reliability score threshold.

Returning to FIG. 4, in some embodiments, step/operation 404 may be performed in accordance with the process that is depicted in FIG. 12. The process that is depicted in FIG. 12 begins at step/operation 1201 when the AR processing computing entity 106 determines a supervision boundary reliability score for the current immersive AR supervision boundary. As described above, during an initial iteration of the iterative supervision boundary update routine 411, the current immersive AR supervision boundary may be an initial current immersive AR supervision boundary that is generated at step/operation 401. Moreover, during a non-initial iteration of the iterative supervision boundary update routine 411, the current immersive AR supervision boundary may the updated immersive AR supervision boundary generated by a previous iteration of the iterative supervision boundary update routine 411 (e.g., by maintaining a current immersive AR supervision boundary if the supervision boundary reliability score for the current immersive AR supervision boundary satisfies a supervision boundary reliability score threshold and modifying the current immersive AR supervision boundary otherwise).

In some embodiments, a supervision boundary reliability score describes an inferred/predicted measure of reliability of an immersive AR supervision boundary in ensuring effective and timely response to a user of an AR device in the event of a response need scenario given the proximate response nodes that cover the immersive AR supervision boundary. In some embodiments, the supervision boundary reliability score for an immersive AR supervision boundary describes (e.g., is determined based at least in part on) at least one of the following: (i) the number of proximate response nodes for a corresponding AR device that are in a covered subset of proximate response nodes for the immersive AR supervision boundary, (ii) the responsiveness scores for the proximate response nodes in the covered subset, (iii) the real-time reliability scores for the proximate response nodes in the covered subset, or (iv) the supervision boundary reachability scores for the proximate response nodes in the covered subset with respect to the immersive AR supervision boundary. In some embodiments, the covered subset for an immersive AR supervision boundary describes each proximate response node whose supervision boundary reachability scores with respect to the immersive AR supervision boundary satisfies (e.g., exceeds) a supervision boundary reliability score threshold.

In some embodiments, a supervision boundary reachability score describes a speed/ease/duration of traveling from a node location (e.g., a provider office location, a caregiver office location, a hospital location, and/or the like) for a respective response node to a least reachable location of a respective immersive AR supervision boundary relative to the node location. In other words, the supervision boundary reachability score describes a minimal speed/ease/duration of traveling from a node location of a respective response node to a point in a respective immersive AR supervision boundary. For example, if the maximum estimated arrival duration from a node location (e.g., a provider location) of a respective response node to a location in a respective immersive AR supervision boundary is 5:03 minutes, then the supervision boundary reachability score for the respective response node with respect to the respective immersive AR supervision boundary is determined based at least in part on the estimated arrival duration. As another example, if a respective immersive AR supervision boundary includes L locations associated with L estimated arrival durations, where each estimated arrival duration is the estimated arrival duration from a node location of a response node to a location of the L locations, then the geographic reachability score is determined based at least in part on the largest estimated arrival duration of the L estimated arrival durations. In some embodiments, if a respective immersive AR supervision boundary includes L locations associated with L supervision boundary reachability scores, where each supervision boundary reachability score describes a speed/ease/ duration of traveling from a node location of a response node to a location of the L locations, then the geographic reachability score is determined based at least in part on the smallest supervision boundary reachability score of the L supervision boundary reachability scores.

In some embodiments, if the supervision boundary reachability score for a proximate response node with respect to an immersive AR supervision boundary satisfies a supervision boundary reachability score threshold, the proximate response node is in a covered subset for the immersive AR supervision boundary. For example, given three proximate response nodes associated with an AR device, if the first proximate response node is associated with a first supervision boundary reachability score of 0.6 with respect to a current immersive AR supervision boundary, the second proximate response node is associated with a second supervision boundary reachability score of 0.4 with respect to the current immersive AR supervision boundary, and the third proximate response node is associated with a third supervision boundary reachability score of 0.7 with respect to the current immersive AR supervision boundary, and further if the supervision boundary reachability score threshold is 0.6 and is satisfied when a supervision boundary reachability score exceeds the supervision boundary reachability score threshold of 0.6, then the covered subset for the current immersive AR supervision boundary includes the first proximate response node and the third proximate response node, but not the second proximate response node. For example, in the operational example of FIG. 11A, the current immersive AR supervision boundary 1101 is associated with the following covered proximate response nodes: A1 and B1. As another example, in the operational example of FIG. 11B, the updated immersive AR supervision boundary 1102 is associated with the following covered proximate response nodes: A1.

In some embodiments, the supervision boundary reliability score for an immersive AR supervision boundary is determined by performing the following operations: (i) converting the immersive AR supervision boundary into R equal-sized supervision boundary regions, (ii) for each region-node pair that comprises a region of the R supervision boundary regions and a proximate response node of the set of proximate response nodes that are in the covered subset for the immersive AR supervision boundary, computing a reachability score describing a speed/ease/duration of traveling from a node location (e.g., a provider office location, a caregiver office location, a hospital location, and/or the like) for the proximate response node to a centroid location of the supervision boundary region, (iii) for each supervision boundary region, determining a minimum reachability scores for all region-node pairs that are associated with the supervision boundary region, (iv) determining a summation of the minimum reachability scores, and (v) determining an inverse measure and/or a negation measure of the summation measure to generate the supervision boundary reliability score. For example, given R=3 and supervision boundary regions $R_1$, $R_2$, and $R_3$, and given that the proximate response nodes in the covered subset for the immersive AR supervision boundary include $N_1$ and $N_2$, and if the reachability score for $N_1$ with respect to $R_1$ is 0.1, the reachability score for $N_2$ with respect to $R_1$ is 0.9, the reachability score for $N_1$ with respect to $R_2$ is 0.9, the reachability score for $N_2$ with respect to $R_2$ is 0.2, the reachability score for $N_1$ with respect to $R_3$ is 0.4, the reachability score for $N_2$ with respect to $R_3$ is 0.6, then the supervision boundary reliability score for the immersive AR supervision boundary may be determined as $(\min(0.1,09)+\min(0.9,0.2)+\min(0.4,0.6))^{-1}=(0.1+0.2+0.4)^{-1}=0.7^{-1}=7.0$.

In some embodiments, the supervision boundary reliability score for an immersive AR supervision boundary is determined based at least in part on an inverse and/or a negation of the output of equation $$\int\int \min_{N_1,\ldots,N_M} D(N_1, (x, y)) dy dx,$$

where D(a,b) describes a reachability score for: (i) a node location of a proximate response node a node that is among the M proximate response nodes in the covered subset for immersive AR supervision boundary, with respect to (ii) the location b in the immersive AR supervision boundary.

At step/operation 1202, the AR processing computing entity 106 determines whether the supervision boundary reliability score satisfies (e.g., exceeds) a supervision boundary reliability score threshold. At step/operation 1203, in response to determining that the supervision boundary reliability score satisfies the supervision boundary reliability score threshold, the AR processing computing entity 106 maintains the current immersive AR supervision boundary as the updated immersive AR supervision boundary. At step/operation 1204, in response to determining that the supervision boundary reliability score fails to satisfy the supervision boundary reliability score threshold, the AR processing computing entity 106 modifies the current immersive AR supervision boundary to generate the updated immersive AR supervision boundary.

In some embodiments, in response to determining that supervision boundary reliability score for a current immersive AR supervision boundary fails to satisfy a supervision boundary reliability score threshold, the AR processing computing entity 106 generates an updated immersive AR supervision boundary by reducing a supervision boundary area of the current immersive AR supervision boundary so that the supervision boundary reliability score satisfies the supervision boundary reliability score threshold. In some embodiments, in response to determining that supervision boundary reliability score for a current immersive AR supervision boundary fails to satisfy a supervision boundary reliability score threshold, the AR processing computing entity 106 generates an updated immersive AR supervision boundary by iteratively reducing a supervision boundary area of the current immersive AR supervision boundary so that the supervision boundary reliability score satisfies the supervision boundary reliability score threshold. In some embodiments, in response to determining that supervision boundary reliability score for a current immersive AR supervision boundary fails to satisfy a supervision boundary reliability score threshold, the AR processing computing entity 106: (i) generates a set of reduced immersive AR supervision boundaries each comprising a subregion of the current immersive AR supervision boundary that has a smaller supervision boundary area relative to the current immersive AR supervision boundary, (ii) for each reduced immersive AR supervision boundary, determines a supervision boundary reliability score, and (iii) selects the updated immersive AR supervision boundary as the reduced immersive AR supervision boundary having the highest supervision boundary reliability score among the reduced immersive AR supervision boundaries whose supervision boundary reliability score satisfies (e.g., exceeds) the supervision boundary reliability score threshold.

An operational example of updating the current immersive AR supervision boundary 1101 to generate an updated immersive AR supervision boundary 1102 that may in some embodiments be performed based at least in part on at least some of the techniques described herein is depicted in FIGS. 11A-11B. As depicted in FIG. 11A, before the proximate response node becomes unavailable (e.g., is set to a negative/zero-valued circumstantial capability parameter), both A1 and B1 are proximate response nodes that are in the covered subset the current immersive AR supervision boundary 1101, which causes the supervision boundary reliability score for the current immersive AR supervision boundary 1101 to have a value that satisfies a supervision boundary reliability score threshold. However, as depicted in FIG. 11B, after B1 becomes unavailable, because of this unavailability, only A1 is in the covered subset the current immersive AR supervision boundary 1101, which decreases the supervision boundary reliability score for the current immersive AR supervision boundary 1101 such that the supervision boundary reliability score for the current immersive AR supervision boundary 1101 no longer satisfies the supervision boundary reliability score threshold. Accordingly, as further depicted in FIG. 11B, the AR processing computing entity 106 reduces the supervision boundary area of the current immersive AR supervision boundary 1101 to generate the updated immersive AR supervision boundary 1102. In some embodiments, because the updated immersive AR supervision boundary 1102 has a smaller area, even while having only A1 in its covered subset, the reachability scores for regions/points of the updated immersive AR supervision boundary 1102 will decrease such that the supervision boundary reliability score increases, and thus the supervision boundary reliability score for the updated immersive AR supervision boundary 1102 satisfies the supervision boundary reliability score threshold.

Accordingly, using the immersive AR supervision boundary updating/adjustment techniques described herein, various embodiments of the present invention address technical advantages associated with resource usage efficiency of generating an immersive AR supervision boundary for an AR software application. Various existing AR solutions generate immersive AR supervision boundaries using a large image/video data captured from an environment of the AR user. Transmitting such image/video data is typically burdensome for computer networks that connect AR devices to AR processing server systems, storing such image/video data is typically burdensome for storage resources of AR devices and AR processing server, and/or processing such image/video is typically burdensome for computational resources of AR processing servers. To address the noted challenges, various embodiments of the present invention introduce machine learning techniques that enable using predictive signals obtained from location-based data and predictive signals obtained from sensory/monitoring data other than image/video data to generate and dynamically maintain immersive AR supervision boundaries. In this way, various embodiments reduce or eliminate the need for transmitting, storing, and/or processing large image/video data to generate immersive AR supervision boundaries in AR software applications, thus improving resource usage efficiency of generating an immersive AR supervision boundary for an AR software application.

Returning to FIG. 4, at step/operation 405, the AR processing computing entity 106 determines whether an immersive AR supervision boundary modification indicator is an affirmative immersive AR supervision boundary modification indicator. In some embodiments, the immersive AR supervision boundary modification indicator describes whether the updated immersive AR supervision boundary that is generated at step/operation 404 is the same as the current immersive AR supervision boundary that was the updated immersive AR supervision boundary before step/operation 404. In some embodiments, the processing computing entity 106 determines an affirmative immersive AR supervision boundary modification indicator if the AR processing computing entity 106 determines that the updated immersive AR supervision boundary that is generated at step/operation 404 is the same as the current immersive AR supervision boundary that was the updated immersive AR supervision boundary before step/operation 404. In some embodiments, the processing computing entity 106 determines a negative immersive AR supervision boundary modification indicator if the AR processing computing entity 106 determines that the updated immersive AR supervision boundary that is generated at step/operation 404 is different from the current immersive AR supervision boundary that was the updated immersive AR supervision boundary before step/operation 404.

At step/operation 406, in response to determining that the immersive AR supervision boundary modification indicator is an affirmative immersive AR supervision boundary modification indicator, the AR processing computing entity 106 performs one or more AR interaction actions/operations based at least in part on the updated immersive AR supervision boundary. Examples of AR interaction actions include providing geographic marker data associated with the updated immersive AR supervision boundary to an AR device, where the AR device may be configured to display AR display elements corresponding to the geographic marker data. For example, as depicted in FIG. 13, the AR interface 1300 (e.g., which may, for example, be displayed by an AR headset device and/or a smart glass device) displays curved color lines, where green-colored curved lines indicate areas that are within boundaries of the updated immersive AR supervision boundary, orange-colored curved lines indicate areas that are at boundaries of the updated immersive AR supervision boundary, and red-colored curved lines indicate areas that are outside boundaries of the updated immersive AR supervision boundary. As further depicted in FIG. 13, the AR interface 1300 further includes a display element 1301 describing an estimated arrival duration to the boundary of the updated immersive AR supervision boundary and the display element 1302 describing an exposure score that may be determined based at least in part on processing the real-time monitoring embedding for the AR device using an exposure score determination machine learning model.

In some embodiments, performing the AR interaction actions includes providing navigational data and a navigator visualization profile to an AR device, where the AR device may be configured to display AR display elements corresponding to the to the navigational data and a navigator visualization profile. For example, as depicted in FIG. 14, the AR interface 1400 displays the navigation instruction element 1401, the navigation instruction element 1402, and the navigator visualization element 1403, where the navigator visualization element 1403 may depict a visualization of an individual familiar to the user (e.g., a family member, a caregiver, and/or the like). In some embodiments, performing the AR interaction actions include providing navigational data and a navigator audio profile, where the AR device may be configured to display AR display elements corresponding to the to the navigational data and broadcast audio data describing navigational instructions that is generated using voice synthesis and based at least in part on voice parameters of the navigator audio profile (e.g., describing voice of a family member, a caregiver, and/or the like).

In some embodiments, performing the AR interaction actions includes providing supervision boundary modification notification data to an agent computing entity associated with a monitoring agent of the AR device user, where the agent computing entity may be configured to display notifications corresponding to the supervision boundary modification notification data. An example of a supervision boundary modification notification 1512 is depicted in the user interface 1502 of FIG. 15B, which may be an updated version of the user interface 1501 of FIG. 15A. In some embodiments, performing the one or more AR interaction actions comprise providing supervision boundary notification data to each responsive computing entity associated with a proximate response node that is in the covered subset for the updated immersive AR supervision boundary, where a responsive computing entity may be configured to display a potential response need scenario notification describing the supervision boundary notification data. In some embodiments, the supervision boundary notification data describe at least one of a name of the AR device user, demographic profile of the AR device user, an exposure score of the AR device user, and/or the like.

After performing the AR interaction actions at step/operation 406, or in response to determining that the immersive AR supervision boundary modification indicator is a negative immersive AR supervision boundary modification indicator at step/operation 405, the AR processing computing entity 106 may return to step/operation 402 to repeat a new iteration of the iterative supervision boundary update routine 411 at a subsequent update timestep using the updated immersive AR supervision boundary, a new real-time monitoring data object, and/or an updated AR device location. In some embodiments, the iterations of the iterative supervision boundary update routine 411 end until the use of the AR device ends and/or until the AR processing computing entity 106 is notified that an exposure-threatening activity (e.g., walking, biking, and/or the like) is terminated by the monitored AR device user.

Accordingly, as described above, various embodiments of the present invention address technical advantages associated with resource usage efficiency of generating an immersive AR supervision boundary for an AR software application. Various existing AR solutions generate immersive AR supervision boundaries using a large image/video data captured from an environment of the AR user. Transmitting such image/video data is typically burdensome for computer networks that connect AR devices to AR processing server systems, storing such image/video data is typically burdensome for storage resources of AR devices and AR processing server, and/or processing such image/video is typically burdensome for computational resources of AR processing servers. To address the noted challenges, various embodiments of the present invention introduce machine learning techniques that enable using predictive signals obtained from location-based data and predictive signals obtained from sensory/monitoring data other than image/video data to generate and dynamically maintain immersive AR supervision boundaries. In this way, various embodiments reduce or eliminate the need for transmitting, storing, and/or processing large image/video data to generate immersive AR supervision boundaries in AR software applications, thus improving resource usage efficiency of generating an immersive AR supervision boundary for an AR software application. An exemplary practical application of various embodiments of the present invention relates to improving resource-usage efficiency of post-prediction systems by using exposure classifications to set the number of allowed computing entities used by the noted post-prediction systems and thus perform operational load balancing for the post-prediction systems (e.g., for post-prediction systems configured to perform automated audit operations on a set pf AR processing systems). For example, in some embodiments, a predictive data analysis computing entity determines D exposure classifications for D AR devices. Then, the count of D AR devices that are associated with an affirmative exposure classification, along with a resource utilization ratio for each AR device, can be used to predict a predicted number of computing entities needed to perform post-prediction processing operations with respect to the D AR devices. For example, in some embodiments, the number of computing entities needed to perform post-prediction processing operations (e.g., automated audit operations) with respect to D AR devices can be determined based at least in part of the output of the equation: $R=\text{ceil}(\Sigma_k^{k=K} ur_k)$, where R is the predicted number of computing entities needed to perform post-prediction processing operations with respect to the D AR devices, ceil(.) is a ceiling function that returns the closest integer that is greater than or equal to the value provided as the input parameter of the ceiling function, k is an index variable that iterates over K AR devices among the D AR devices that are associated with affirmative exposure classifications, and $ur_k$ is the estimated resource utilization ratio for a kth AR device that may be determined based at least in part on a count of iterative supervision boundary update routine iterations performed by the AR device. In some embodiments, once R is generated, a predictive data analysis computing entity can use R to perform operational load balancing for a server system that is configured to perform post-prediction processing operations with respect to D AR devices. This may be done by allocating computing entities to the post-prediction processing operations if the number of currently-allocated computing entities is below R, and deallocating currently-allocated computing entities if the number of currently-allocated computing entities is above R.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, using one or more processors and an exposure classification machine learning framework and based at least in part on a real-time monitoring data object associated with an augmented reality (AR) device and a historical state data object associated with the AR device, an exposure classification for the AR device, wherein:
(i) the real-time monitoring data object comprises physiological monitoring data of a user of the AR device and environmental data of an environment of the user,
(ii) the exposure classification corresponds to an inference for an intervention provided by an intervention provider,
(iii) the exposure classification machine learning framework comprises a real-time embedding machine learning model, an exposure clustering machine learning model, and a cluster mapping machine learning model,
(iv) the real-time embedding machine learning model is configured to generate a real-time monitoring embedding for the AR device based at least in part on the real-time monitoring data object and the historical state data object,
(v) the exposure clustering machine learning model is configured to generate a selected exposure cluster for the AR device based at least in part on the real-time monitoring embedding for the AR device,
(vi) the selected exposure cluster comprises a subset of one or more real-time monitoring embeddings from a plurality of real-time monitoring embeddings, and
(vii) the cluster mapping machine learning model is configured to map the selected exposure cluster for the AR device to the exposure classification for the AR device based at least in part on a cluster affinity score for the real-time monitoring embedding with respect to the selected exposure cluster; and
in response to determining that the AR device is associated with an affirmative exposure cluster to provide the intervention, using the one or more processors:
identifying one or more proximate response nodes that are associated with a monitoring category for the AR device and a current AR device location for the AR device, wherein the one or more proximate response nodes represent one or more service providers that satisfy one or more filtering criteria for the AR device,
for a proximate response node of the one or more proximate response nodes, generating, using a responsiveness scoring machine learning model and based at least in part on one or more responsiveness parameters associated with the proximate response node, a responsiveness score, wherein the one or more responsiveness parameters comprise a real-time reachability score that is determined based at least in part on a node location for the proximate response node and the current AR device location,
determining a covered subset of the one or more proximate response nodes, wherein: (i) the covered subset comprises a covered proximate response node that is associated with a supervision boundary reachability score that satisfies a supervision boundary reachability score threshold, and (ii) each supervision boundary reachability score for a corresponding proximate response node of the covered subset is determined based at least in part on a corresponding node location for the corresponding proximate response node and a least reachable location of a current immersive AR supervision boundary relative to the corresponding node location, wherein the current immersive AR supervision boundary comprises a geographic region surrounding the current AR device location,
determining, based at least in part on the covered subset, a supervision boundary reliability score, and
in response to determining that the supervision boundary reliability score fails to satisfy a supervision boundary reliability score threshold, performing one or more AR interaction actions based at least in part on an updated immersive AR supervision boundary, wherein (i) the updated immersive AR supervision boundary is generated by reducing a supervision boundary area of the current immersive AR supervision boundary so that the supervision boundary reliability score satisfies the supervision boundary reliability score threshold and (ii) the one or more AR interaction actions comprise providing prediction-based data to the AR device to improve resource usage efficiency in displaying an AR display element corresponding to the updated immersive AR supervision boundary.

2. The computer-implemented method of claim 1, wherein the real-time monitoring data object comprises, for a real-time monitoring category of a plurality of real-time monitoring categories, a categorical real-time monitoring vector.

3. The computer-implemented method of claim 2, wherein the real-time embedding machine learning model is configured to perform operations comprising:
for the real-time monitoring category, generating, using a sequential processing sub-model for the real-time monitoring category and based at least in part on the categorical real-time monitoring vector for the real-time monitoring category and a sequential model hidden state vector for the sequential processing sub-model, a categorical real-time monitoring embedding vector; and
generating the real-time monitoring embedding based at least in part on the categorical real-time monitoring embedding vector.

4. The computer-implemented method of claim 3, wherein generating the real-time monitoring embedding based at least in part on the categorical real-time monitoring embedding vector comprises:

generating the real-time monitoring embedding based at least in part on the categorical real-time monitoring embedding vector and the historical state data object.

5. The computer-implemented method of claim 4, wherein the sequential processing sub-model for the real-time monitoring category is configured to:
  generate, using one or more domain conversion operations and based at least in part on the categorical real-time monitoring vector for the real-time monitoring category, a domain-converted embedding for the real-time monitoring category,
  generate, using one or more one-dimensional convolutional neural network operations and based at least in part on the domain-converted embedding for the real-time monitoring category, a convolutional embedding for the real-time monitoring category, and
  generate, using one or more recurrent neural network operations and based at least in part on the convolutional embedding for the real-time monitoring category, the categorical real-time monitoring embedding vector for the real-time monitoring category.

6. The computer-implemented method of claim 1, wherein the cluster mapping machine learning model is configured to:
  in response to determining that the cluster affinity score satisfies a cluster affinity score threshold, generate the exposure classification based at least in part on a ground-truth label associated with the selected exposure cluster.

7. The computer-implemented method of claim 1, wherein the cluster mapping machine learning model is configured to:
  in response to determining that the cluster affinity score fails to satisfy a cluster affinity score threshold, apply one or more boundary classification rules to generate the exposure classification.

8. The computer-implemented method of claim 1, wherein the one or more responsiveness parameters for the proximate response node comprise a historical experience quality parameter and a historical responsiveness parameter.

9. The computer-implemented method of claim 1, wherein performing the one or more AR interaction actions comprises providing geographic marker data associated with the updated immersive AR supervision boundary to the AR device.

10. The computer-implemented method of claim 1, wherein performing the one or more AR interaction actions comprises providing navigational data and a navigator visualization profile to the AR device.

11. The computer-implemented method of claim 1, wherein performing the one or more AR interaction actions comprises providing supervision boundary modification notification data to an agent computing entity associated with a monitoring agent.

12. The computer-implemented method of claim 1, wherein performing the one or more AR interaction actions comprises providing supervision boundary notification data to each responsive computing entity associated with the covered subset for the updated immersive AR supervision boundary.

13. The computer-implemented method of claim 1, wherein the supervision boundary reliability score is determined based at least in part on a count of proximate response nodes in the covered subset.

14. The computer-implemented method of claim 1, wherein the supervision boundary reliability score is determined based at least in part on each corresponding responsiveness score for the corresponding proximate response node in covered subset.

15. A system comprising
  one or more processors and
  at least one memory storing processor-executable instructions that, when executed by any of the one or more processors, cause the one or more processors to perform operations comprising:
  generating, using an exposure classification machine learning framework and based at least in part on a real-time monitoring data object associated with an augmented reality (AR) device and a historical state data object associated with the AR device, an exposure classification for the AR device, wherein:
  (i) the real-time monitoring data object comprises physiological monitoring data of a user of the AR device and environmental data of an environment of the user,
  (ii) the exposure classification corresponds to an inference for an intervention provided by an intervention provider,
  (iii) the exposure classification machine learning framework comprises a real-time embedding machine learning model, an exposure clustering machine learning model, and a cluster mapping machine learning model,
  (iv) the real-time embedding machine learning model is configured to generate a real-time monitoring embedding for the AR device based at least in part on the real-time monitoring data object and the historical state data object,
  (v) the exposure clustering machine learning model is configured to generate a selected exposure cluster for the AR device based at least in part on the real-time monitoring embedding for the AR device,
  (vi) the selected exposure cluster comprises a subset of one or more real-time monitoring embeddings from a plurality of real-time monitoring embeddings, and
  (vii) the cluster mapping machine learning model is configured to map the selected exposure cluster for the AR device to the exposure classification for the AR device based at least in part on a cluster affinity score for the real-time monitoring embedding with respect to the selected exposure cluster; and
  in response to determining that the AR device is associated with an affirmative exposure cluster to provide the intervention:
    identifying one or more proximate response nodes that are associated with a monitoring category for the AR device and a current AR device location for the AR device, wherein the one or more proximate response nodes represent one or more service providers that satisfy one or more filtering criteria for the AR device,
    for a proximate response node of the one or more proximate response nodes, generating, using a responsiveness scoring machine learning model and based at least in part on one or more responsiveness parameters associated with the proximate response node, a responsiveness score, wherein the one or more responsiveness parameters comprise a real-time reachability score that is determined based at least in part on a node location for the proximate response node and the current AR device location,
    determining a covered subset of the one or more proximate response nodes, wherein: (i) the covered subset comprises a covered proximate response node that is associated with a supervision boundary reachability score that satisfies a supervision boundary reachability score threshold, and (ii) each supervision boundary reachability score for a corresponding proximate response node of the covered subset is determined based at least in part on a corresponding node location for the corresponding proximate response node and a least reachable location of a current immersive AR supervision boundary relative to the corresponding node location, wherein the current immersive AR supervision boundary comprises a geographic region surrounding the current AR device location, determining, based at least in part on the covered subset, a supervision boundary reliability score, and in response to determining that the supervision boundary reliability score fails to satisfy a supervision boundary reliability score threshold, performing one or more AR interaction actions based at least in part on an updated immersive AR supervision boundary, wherein (i) the updated immersive AR supervision boundary is generated by reducing a supervision boundary area of the current immersive AR supervision boundary so that the supervision boundary reliability score satisfies the supervision boundary reliability score threshold and (ii) the one or more AR interaction actions comprise providing prediction-based data to the AR device to improve resource usage efficiency in displaying an AR display element corresponding to the updated immersive AR supervision boundary.

16. The system of claim 15, wherein the real-time monitoring data object comprises, for a real-time monitoring category of a plurality of real-time monitoring categories, a categorical real-time monitoring vector.

17. The system of claim 16, wherein the real-time embedding machine learning model is configured to perform operations comprising:

for the real-time monitoring category, generating, using a sequential processing sub-model for the real-time monitoring category and based at least in part on the categorical real-time monitoring vector for the real-time monitoring category and a sequential model hidden state vector for the sequential processing sub-model, a categorical real-time monitoring embedding vector; and generating the real-time monitoring embedding based at least in part on the categorical real-time monitoring embedding vector.

18. The system of claim 17, wherein generating the real-time monitoring embedding based at least in part on the categorical real-time monitoring embedding vector comprises:

generating the real-time monitoring embedding based at least in part on the categorical real-time monitoring embedding vector and the historical state data object.

19. The system of claim 18, wherein the sequential processing sub-model for the real-time monitoring category is configured to:

generate, using one or more domain conversion operations and based at least in part on the categorical real-time monitoring vector for the real-time monitoring category, a domain-converted embedding for the real-time monitoring category, generate, using one or more one-dimensional convolutional neural network operations and based at least in part on the domain-converted embedding for the real-time monitoring category, a convolutional embedding for the real-time monitoring category, and generate, using one or more recurrent neural network operations and based at least in part on the convolutional embedding for the real-time monitoring category, the categorical real-time monitoring embedding vector for the real-time monitoring category.

20. One or more non-transitory computer-readable storage media storing instructions that, when executed by one or more processors, cause the one or more processors to perform operations comprising:

generating, using an exposure classification machine learning framework and based at least in part on a real-time monitoring data object associated with an augmented reality (AR) device and a historical state data object associated with the AR device, an exposure classification for the AR device, wherein:

(i) the real-time monitoring data object comprises physiological monitoring data of a user of the AR device and environmental data of an environment of the user, (ii) the exposure classification corresponds to an inference for an intervention provided by an intervention provider, (iii) the exposure classification machine learning framework comprises a real-time embedding machine learning model, an exposure clustering machine learning model, and a cluster mapping machine learning model, (iv) the real-time embedding machine learning model is configured to generate a real-time monitoring embedding for the AR device based at least in part on the real-time monitoring data object and the historical state data object, (v) the exposure clustering machine learning model is configured to generate a selected exposure cluster for the AR device based at least in part on the real-time monitoring embedding for the AR device, (vi) the selected exposure cluster comprises a subset of one or more real-time monitoring embeddings from a plurality of real-time monitoring embeddings, and (vii) the cluster mapping machine learning model is configured to map the selected exposure cluster for the AR device to the exposure classification for the AR device based at least in part on a cluster affinity score for the real-time monitoring embedding with respect to the selected exposure cluster; and in response to determining that the AR device is associated with an affirmative exposure cluster to provide the intervention:

identifying one or more proximate response nodes that are associated with a monitoring category for the AR device and a current AR device location for the AR device, wherein the one or more proximate response nodes represent one or more service providers that satisfy one or more filtering criteria for the AR device, for a proximate response node of the one or more proximate response nodes, generating, using a responsiveness scoring machine learning model and based at least in part on one or more responsiveness parameters associated with the proximate response node, a responsiveness score, wherein the one or more responsiveness parameters comprise a real-time reachability score that is determined based at least in part on a node location for the proximate response node and the current AR device location, determining a covered subset of the one or more proximate response nodes, wherein: (i) the covered subset comprises a covered proximate response node that is associated with a supervision boundary reachability score that satisfies a supervision boundary reachability score threshold, and (ii) each supervision boundary reachability score for a corresponding proximate response node of the covered subset is determined based at least in part on a corresponding node location for the corresponding proximate response node and a least reachable location of a current immersive AR supervision boundary relative to the corresponding node location, wherein the current immersive AR supervision boundary comprises a geographic region surrounding the current AR device location, determining, based at least in part on the covered subset, a supervision boundary reliability score, and in response to determining that supervision boundary reliability score fails to satisfy a supervision boundary reliability score threshold, performing one or more AR interaction actions based at least in part on an updated immersive AR supervision boundary, wherein (i) the updated immersive AR supervision boundary is generated by reducing a supervision boundary area of the current immersive AR supervision boundary so that the supervision boundary reliability score satisfies the supervision boundary reliability score threshold and (ii) the one or more AR interaction actions comprise providing prediction-based data to the AR device to improve resource usage efficiency in displaying an AR display element corresponding to the updated immersive AR supervision boundary.

* * * * *